(12) United States Patent
Shibayama et al.

(10) Patent No.: US 10,936,019 B2
(45) Date of Patent: Mar. 2, 2021

(54) APPARATUS FOR PREVENTING KEYTOPS FROM PROTRUDING FROM A TOP SURFACE OF AN ELECTRONIC APPARATUS

(71) Applicant: LENOVO (SINGAPORE) PTE. LTD., Singapore (SG)

(72) Inventors: Yoshiyuki Shibayama, Kanagawa (JP); Hiroaki Agata, Kanagawa (JP); Eiji Shinohara, Kanagawa (JP); Hiroyuki Noguchi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/713,916

(22) Filed: Dec. 13, 2019

(65) Prior Publication Data
US 2020/0192436 A1 Jun. 18, 2020

(30) Foreign Application Priority Data
Dec. 13, 2018 (JP) .................................. 2018-233744

(51) Int. Cl.
*G06F 1/16* (2006.01)
(52) U.S. Cl.
CPC ............ *G06F 1/1662* (2013.01); *G06F 1/169* (2013.01); *G06F 1/1616* (2013.01); *G06F 1/1624* (2013.01); *G06F 1/1666* (2013.01); *G06F 1/1681* (2013.01)
(58) Field of Classification Search
CPC .... G06F 3/0219; G06F 3/0221; G06F 1/1662; G06F 3/1664; G06F 3/1666
USPC ........................................ 361/679.08–679.17
See application file for complete search history.

(56) References Cited

U.S. PATENT DOCUMENTS

| | | | | |
|---|---|---|---|---|
| 3,671,822 | A * | 6/1972 | Leno | B41J 5/14 361/288 |
| 5,602,715 | A * | 2/1997 | Lempicki | G06F 1/1616 200/344 |
| 5,635,928 | A * | 6/1997 | Takagi | G06F 1/1616 341/22 |
| 5,694,124 | A * | 12/1997 | Wood | H03K 17/969 200/292 |

(Continued)

FOREIGN PATENT DOCUMENTS

| | | |
|---|---|---|
| JP | 05080878 A | 4/1993 |
| JP | 20140120098 A | 6/2014 |

(Continued)

*Primary Examiner* — Adrian S Wilson
(74) *Attorney, Agent, or Firm* — Antony P. Ng; Russell Ng PLLC

(57) ABSTRACT

An electronic apparatus capable of preventing keytops or a pointing stick from protruding from a chassis top surface when not being in use is disclosed. The electronic apparatus includes a set of keytops each movable up and down between a first position to which the keytop ascends by a biasing force of a rubber dome and a second position to which the keytop descends against the biasing force; a set of drive members each extend along the left-right direction, each movable in the left-right direction relative to the keytops; a link member connecting adjacent drive members to enable coordinated operation; and a drive mechanism that moves one of the drive members connected by the link member.

15 Claims, 17 Drawing Sheets

(56) References Cited

U.S. PATENT DOCUMENTS

| | | | | |
|---|---|---|---|---|
| 5,793,605 A * | 8/1998 | Sellers | .................. | G06F 1/1616 |
| | | | | 200/344 |
| 5,857,148 A * | 1/1999 | Weisshappel | ....... | H01M 2/1066 |
| | | | | 455/575.3 |
| 6,314,274 B1 * | 11/2001 | Kumagai | ............ | H04M 1/0214 |
| | | | | 361/679.13 |
| 7,221,561 B2 * | 5/2007 | Pan | ........................ | H01R 35/04 |
| | | | | 361/679.08 |
| 9,040,851 B2 * | 5/2015 | Krumpelman | ......... | H01H 13/85 |
| | | | | 200/5 A |
| 2006/0120029 A1 * | 6/2006 | Ryu | ........................ | H04M 1/23 |
| | | | | 361/679.09 |
| 2011/0170250 A1 * | 7/2011 | Bhutani | ................ | G06F 1/1666 |
| | | | | 361/679.2 |
| 2014/0168875 A1 * | 6/2014 | Nakamura | ......... | H01H 13/7065 |
| | | | | 361/679.09 |
| 2015/0092330 A1 * | 4/2015 | Kershek | ................ | G06F 1/1666 |
| | | | | 361/679.09 |
| 2016/0161987 A1 * | 6/2016 | Jacobs | .................. | G06F 1/1662 |
| | | | | 361/679.11 |
| 2016/0334835 A1 * | 11/2016 | Tamura | ................ | G06F 1/1616 |

FOREIGN PATENT DOCUMENTS

| | | |
|---|---|---|
| JP | 2016212722 A | 12/2016 |
| JP | 20160212722 A | 12/2016 |
| JP | 2018013974 A | 1/2018 |
| JP | 2018014074 A | 1/2018 |
| WO | 2015030713 A1 | 3/2015 |

* cited by examiner

APPARATUS FOR PREVENTING KEYTOPS FROM PROTRUDING FROM A TOP SURFACE OF AN ELECTRONIC APPARATUS

PRIORITY CLAIM

The present application claims benefit of priority under 35 U.S.C. §§ 120, 365 to the previously filed Japanese Patent Application No. JP2018-233744 with a priority date of Dec. 13, 2018, which is incorporated by reference herein.

TECHNICAL FIELD

The present invention relates to electronic apparatuses in general, and in particular to an electronic apparatus capable of preventing an operation member, such as keytops or a pointing stick, from protruding from a top surface of the electronic apparatus when the electronic apparatus is not in use.

BACKGROUND

An electronic apparatus, such as a laptop PC, typically includes a keyboard device having a set of keytops elastically supported so as to be movable up and down. The electronic apparatus may also include a pointing stick instead of a mouse.

The keyboard device needs to ensure sufficient keystroke in order to achieve high operability. This obstructs chassis thickness reduction. Moreover, in the laptop PC, the display needs to be kept from interfering with the keyboard device when the display chassis is closed. Likewise, the pointing stick needs to be kept from interfering with the closed display, while it protrudes upward to some extent in order to achieve high operability.

In an electronic apparatus in which a display chassis is connected to a main body chassis so as to be flippable over the 180° position up to the 360° position, a surface having a keyboard and a pointing stick may come into direct contact with a desk or the like. The keytops or the pointing stick is likely to be damaged in such a case.

Some keyboards may include a drive member (e.g., a rotation shaft member or a left-right slide member) for pressing the keytops or the pointing stick and a slide member for driving the drive member. In the structures, a pair of slide members are provided at the left and right ends of the keyboard device. When the chassis is reduced in thickness or size, it may be difficult to secure a space for installing the slide members on the left and right of the keyboard device. In particular, an electronic apparatus such as a laptop PC needs to carry a set of antennas conforming to a set of wireless standards and a large speaker device, and also the keyboard bezel is increasingly reduced in width. This makes it more difficult to secure the installation space for the slide members.

Consequently, it would be desirable to provide a method and apparatus for preventing an operation member, such as keytops or a pointing stick, from protruding from a top surface of a laptop PC when the laptop PC is not being in use.

SUMMARY

In accordance with an embodiment of the present disclosure, a base plate; a set of keytops that are supported on a top surface side of the base plate, are each movable up and down between a first position to which the keytop ascends by a biasing force of an elastic member and a second position to which the keytop descends against the biasing force of the elastic member, and are aligned in a front-rear direction and a left-right direction; a set of drive members that each extend along the left-right direction on the top surface side of the base plate, are each movable in the left-right direction relative to the keytops, and are aligned in the front-rear direction; a link member that connects drive members adjacent in the front-rear direction to enable coordinated operation; and a drive mechanism configured to move one of the drive members connected by the link member. Each of the keytops includes a pressed part, and each of the drive members includes a pressing part that, when the drive member moves relative to the keytop, presses the pressed part to move the keytop from the first position to the second position, and when the drive mechanism moves one of the drive members connected by the link member, the link member moves an other one of the drive members using the movement of the one drive member.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

1. Overall Structure of Electronic Apparatus

Figure 1:
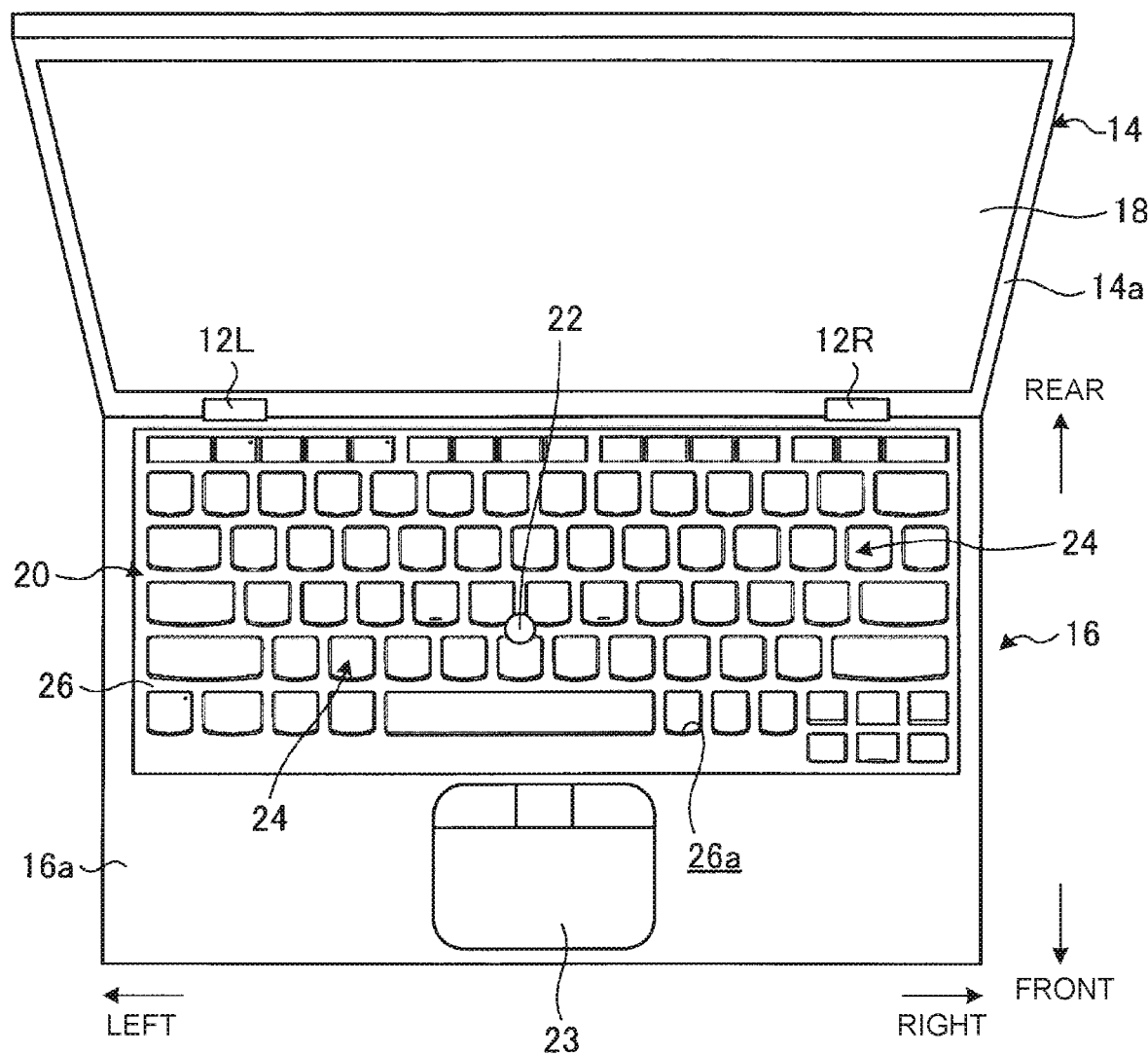
FIG. 1 is a plan view of an electronic apparatus, according to one embodiment.
Figure 2A:
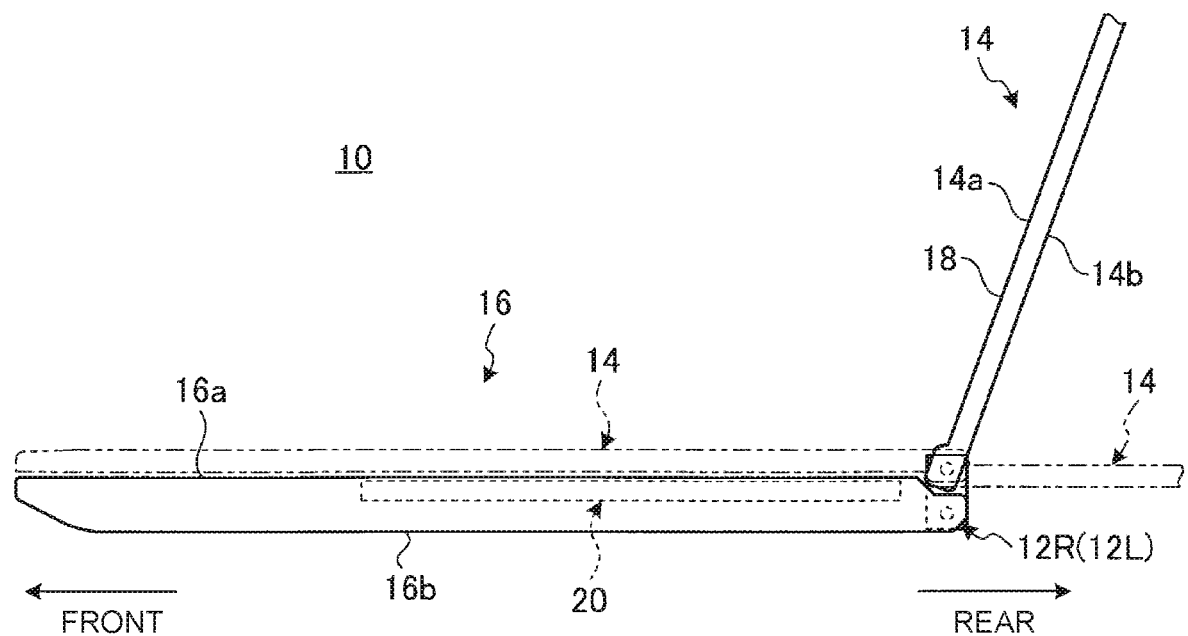
FIG. 2A is a side view of the electronic apparatus from FIG. 1.
Figure 2B:
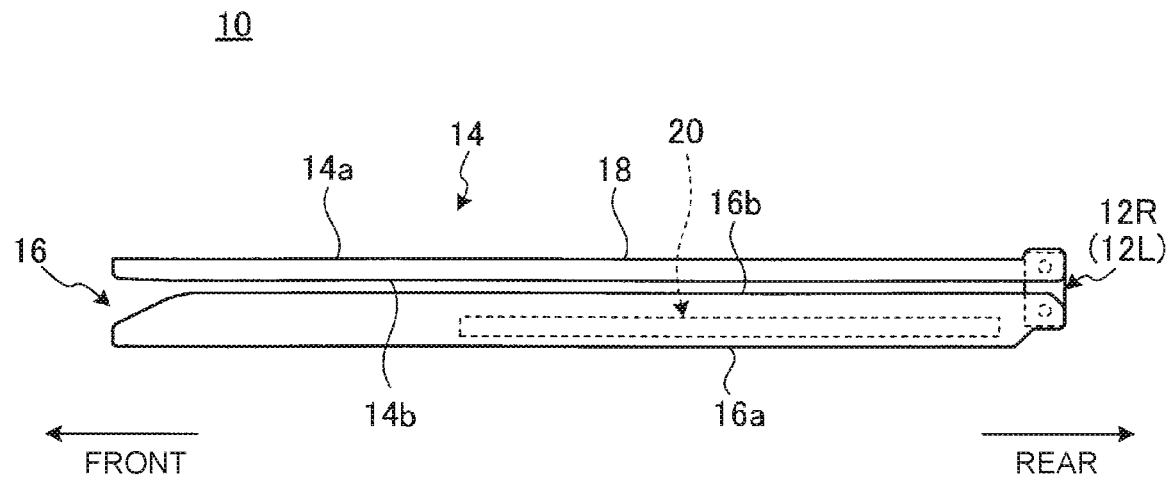
FIG. 2B is a side view of the electronic apparatus in tablet PC use form in which a display chassis is rotated in the opening direction from the state illustrated in FIG. 2A to a 360° position.

FIG. 1 is a plan view of an electronic apparatus 10, according to one embodiment. FIG. 1 illustrates the electronic apparatus 10 in laptop PC use form with a display chassis 14 being opened from a main body chassis 16 by hinges 12L and 12R, as seen from above. FIG. 2A is a side view of the electronic apparatus 10 illustrated in FIG. 1. FIG. 2B is a side view of the electronic apparatus 10 in tablet PC use form with the display chassis 14 being rotated in the opening direction from the state illustrated in FIG. 2A to a 360 position.

The electronic apparatus 10 according to this embodiment is a convertible PC usable as a laptop PC and a tablet PC. In a state in which the display chassis 14 is rotated to an angle position of about 90° to 180° with respect to the main body chassis 16, the electronic apparatus 10 is in a laptop mode suitable for use as a laptop PC (see FIGS. 1 and 2A). In a state in which the display chassis 14 is rotated to a 360° position with respect to the main body chassis 16, the electronic apparatus 10 is in a tablet mode suitable for use as a tablet PC (see FIG. 2B). The electronic apparatus 10 may be a typical laptop PC in which the display chassis 14 is rotatable in an angle range of about 0° to 180° with respect to the main body chassis 16. The electronic apparatus 10 is not limited to a convertible PC or a laptop PC, and may be, for example, a mobile phone, a smart phone, or an electronic organizer.

Hereafter, based on the laptop mode illustrated in FIGS. 1 and 2A as seen from a user who operates a keyboard device 20 while viewing a display 18, the front side is referred to as "front," the rear side as "rear," the thickness direction of the main body chassis 16 as "up-down direction," and the width direction of the main body chassis 16 as "left-right direction."

Regarding the angle position of the display chassis 14 with respect to the main body chassis 16, the posture in which the display chassis 14 is in a fully closed state with respect to the main body chassis 16 and their respective front surface 14a and top surface 16a face each other is a 0° position (see the display chassis 14 designated by dashed-two dotted lines above the main body chassis 16 in FIG. 2A). At the 0° position, the closed display 18 faces the keyboard device 20. Each angle position of the display chassis 14 in the direction in which the display chassis 14 is rotated in the opening direction with respect to the 0° position will be described below. The display chassis 14 can be rotated over a 180° position (see the display chassis 14 designated by dashed-two dotted lines behind the main body chassis 16 in FIG. 2A). At a 360 position (see FIG. 2B), the respective back surfaces 14b and 16b of the display chassis 14 and the main body chassis 16 face each other. Each of these angle positions such as 0° position, 180° position, 360° position, etc. may involve a slight deviation from the accurate angle position indicated by the angle value due to the structures of the main body chassis 16, the display chassis 14, and the hinges 12L and 12R.

As illustrated in FIGS. 1, 2A, and 2B, the electronic apparatus 10 has a structure in which the display chassis 14 and the main body chassis 16 are connected so as to be rotatable from the 0° position to the 360° position by the pair of left and right hinges 12L and 12R (hereafter also collectively referred to as "hinges 12"). The display chassis 14 is an approximately plate-like thin chassis. The display 18 is, for example, a touch-screen liquid crystal display.

The main body chassis 16 is shaped like a flat box, and provided with the hinges 12 at its rear end. The hinges 12 have, for example, a bi-axial structure, and each hinge axis serves as a rotation shaft for the main body chassis 16 and the display chassis 14. The main body chassis 16 stores various electronic components such as a substrate, a processor, and memory (not illustrated). The keyboard device 20 is located at the top surface 16a of the main body chassis 16. A pointing stick 22 is located at an approximate center of the keyboard device 20. A touchpad 23 is located to the front of the keyboard device 20. The pointing stick 22 and the touchpad 23 are each operated instead of a mouse, and enables operation of a cursor (mouse pointer) displayed on the display 18. Three functional buttons that function in coordination with cursor operation by the pointing stick 22 or the touchpad 23 are located to the rear of the touchpad 23.

The keyboard device 20 includes a set of keytops 24 aligned in the front-rear direction and in the left-right direction. Each keytop 24 has an isolation-type independent structure, with the surrounding gaps being defined by a frame 26. The frame 26 is a netlike plate having a set of hole parts where the keytops 24 are located.

Figure 6A:
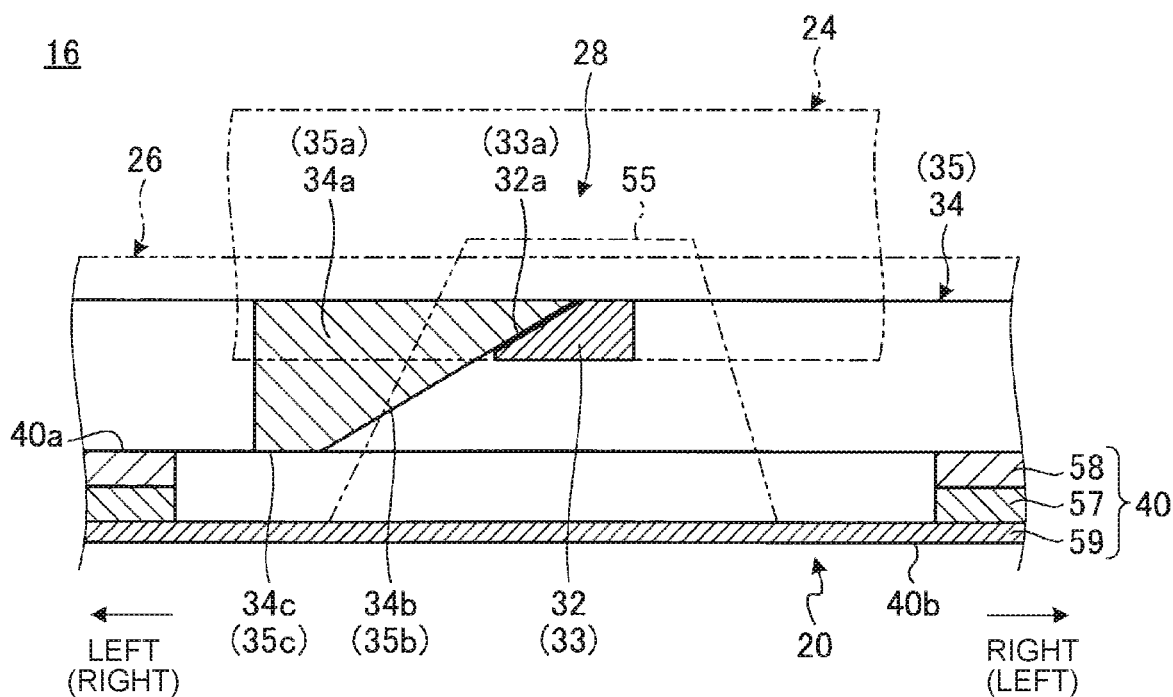
FIG. 6A is a side-sectional view illustrating a state in which the keytop is at the use position in the key position setting mechanism illustrated in FIG. 3.
Figure 6B:
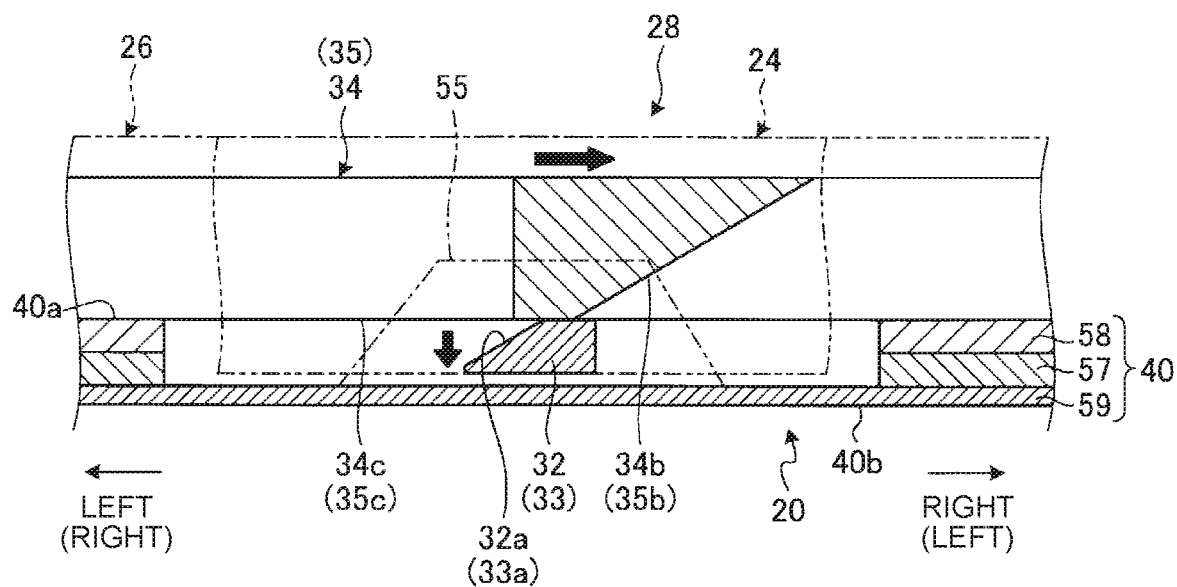
FIG. 6B is a side sectional view in a state in which the keytop is set at the storage position from the state illustrated in FIG. 6A by the key position setting mechanism.

The electronic apparatus 10 includes a key position setting mechanism 28 that, at least at the 0° position and the 360° position, moves the keytops 24 to a storage position by depressing the keytops 24 downward from a use position in normal operation and holds the keytops 24 (see FIGS. 6A and 6B). The electronic apparatus 10 also includes a stick position setting mechanism 30 that, at least at the 0° position and the 360° position, moves the pointing stick 22 to a lowered position by lowering the pointing stick 22 from an elevated position in normal operation and holds the pointing stick 22 (see FIGS. 9A to 9C). The electronic apparatus 10 thus has a thin structure in which the keytops 24 and the pointing stick 22 do not protrude from the top surface 16a of the main body chassis 16 at the 0° position or the 360° position. The key position setting mechanism 28 and the stick position setting mechanism 30 operate with the rotation operation of the display chassis 14 by the hinges 12.

2. Key Position Setting Mechanism

Figure 3:
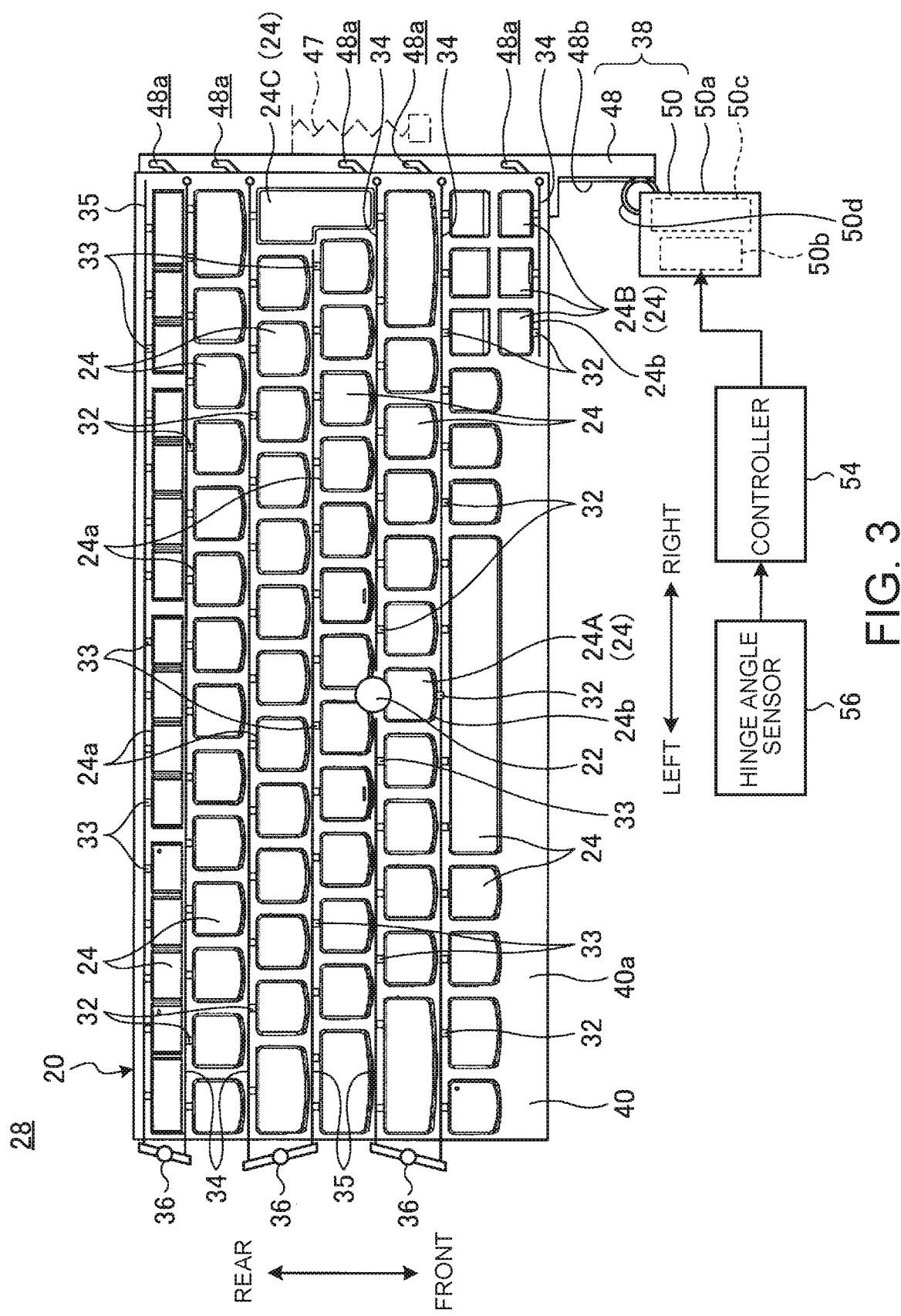
FIG. 3 is a plan view illustrating the structure of a key position setting mechanism in a state in which keytops are at a use position.
Figure 4A:
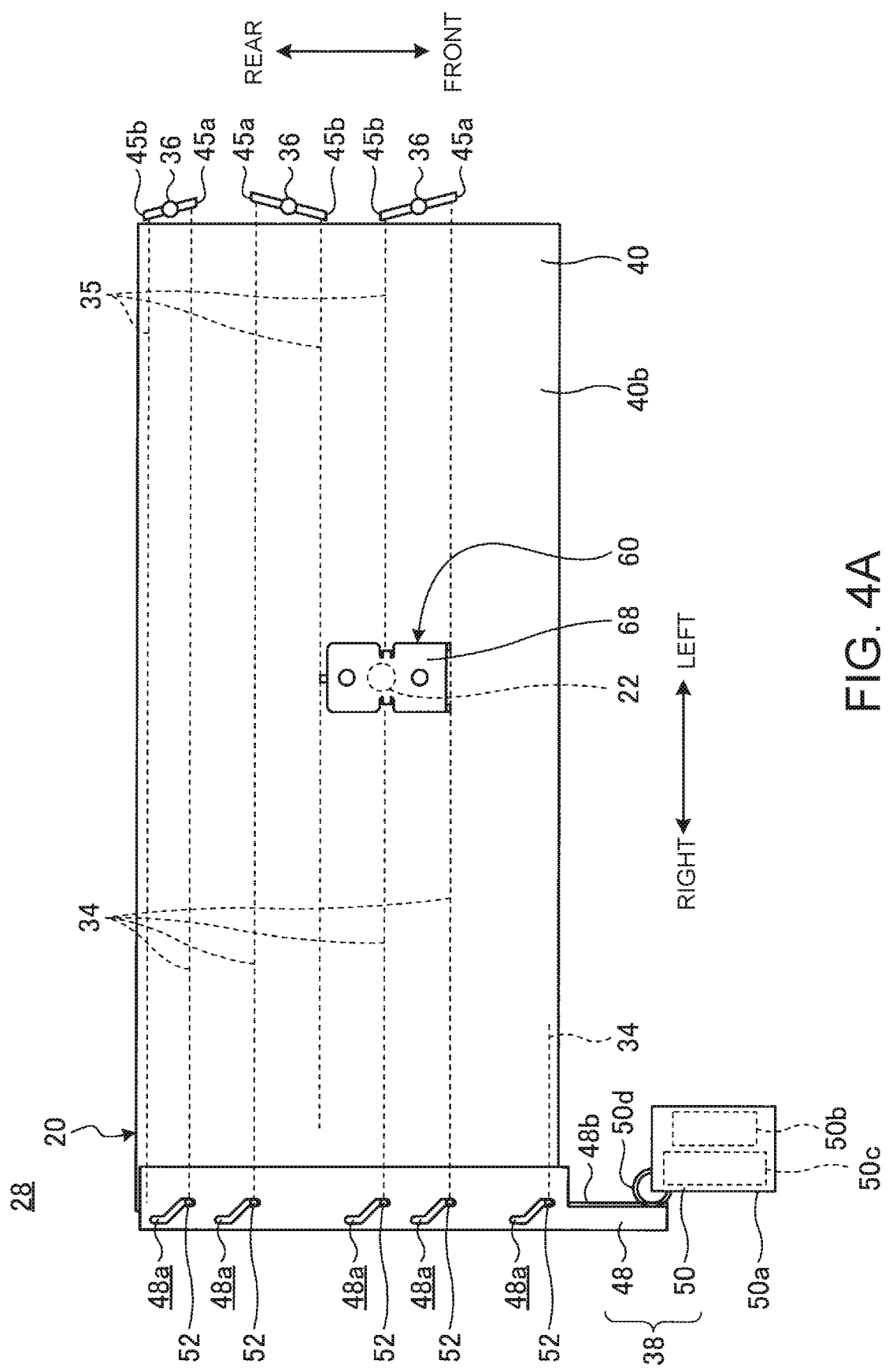
FIG. 4A is a bottom view illustrating the structure of the key position setting mechanism illustrated in FIG. 3.
Figure 4B:
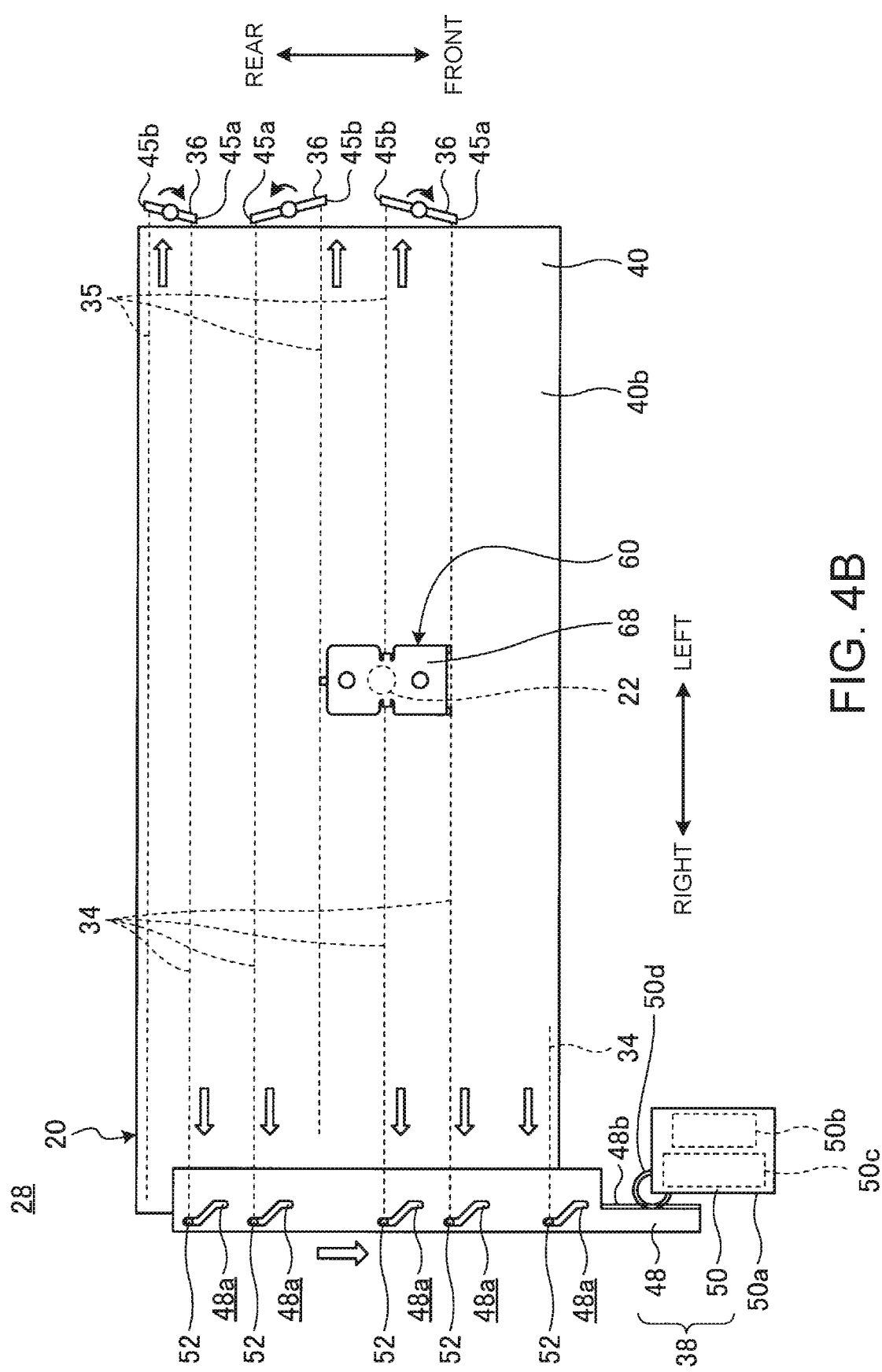
FIG. 4B is a bottom view in a state in which the key position setting mechanism illustrated in FIG. 4A is operated to set the keytops at a storage position.
Figure 5A:
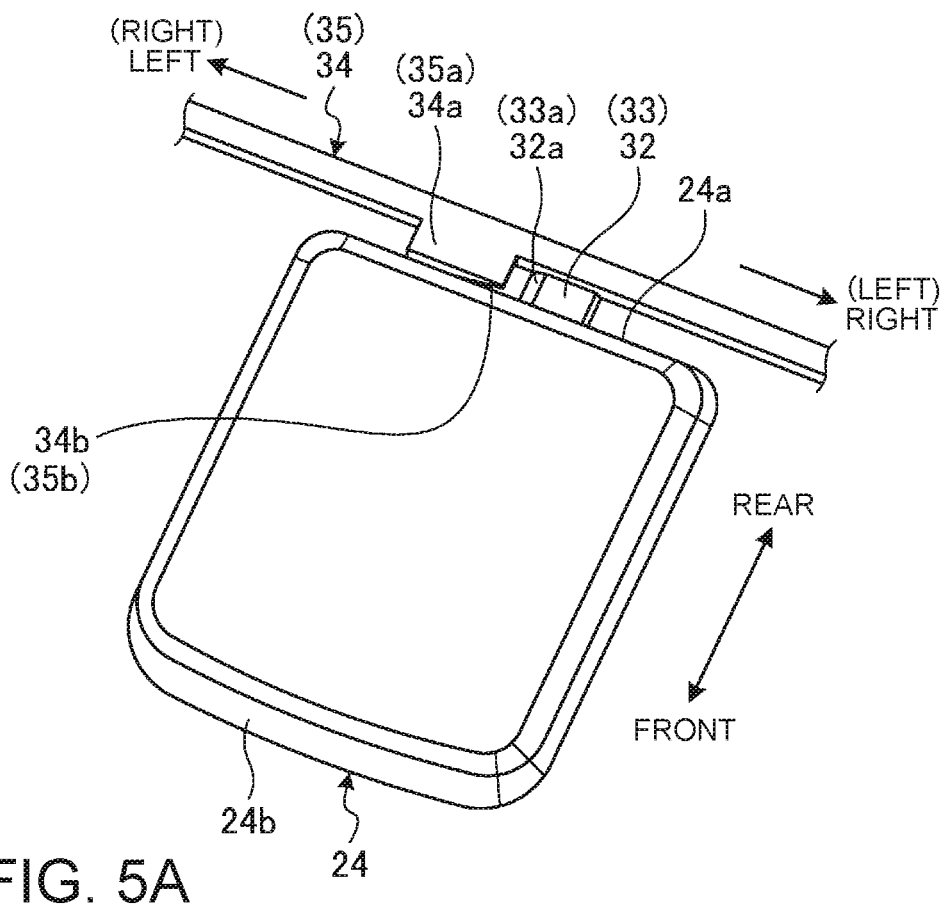
FIG. 5A is an enlarged perspective view of a keytop at the use position and its surroundings.
Figure 5B:
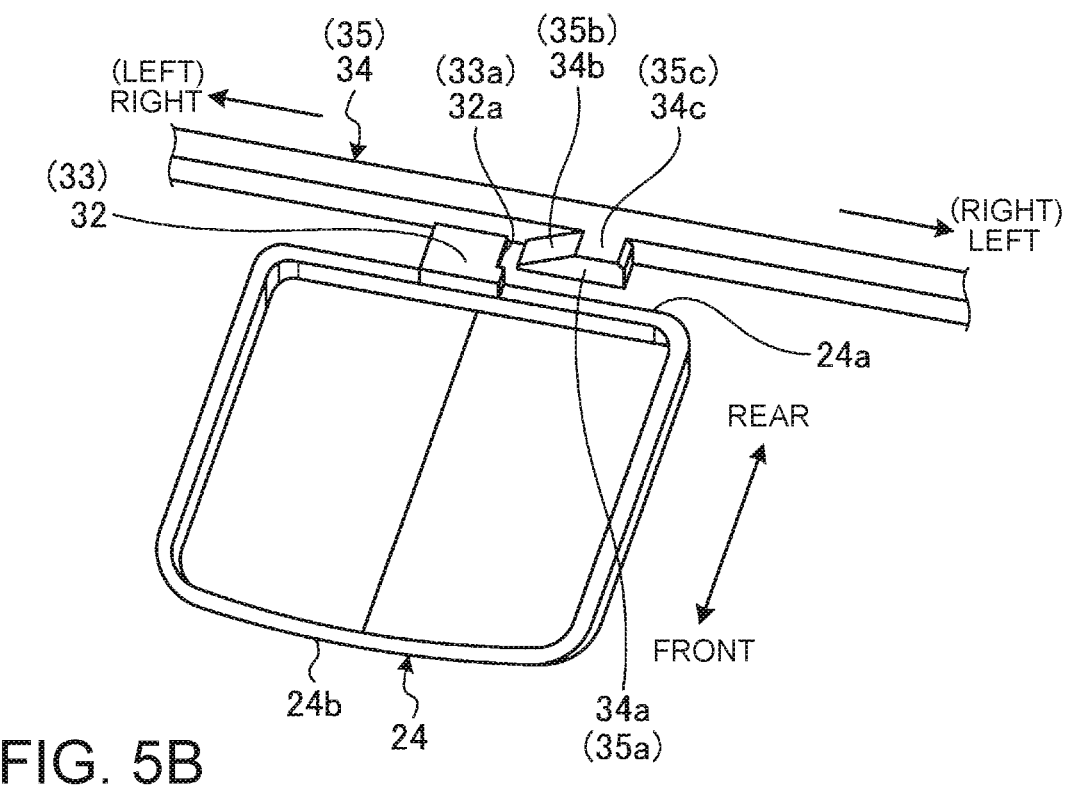
FIG. 5B is a perspective view of the keytop illustrated in FIG. 5A as seen from the back.

An example of the structure of the key position setting mechanism 28 will be described below. FIG. 3 is a plan view illustrating the structure of the key position setting mechanism 28 in a state in which the keytops 24 are at the use position. FIG. 4A is a bottom view illustrating the structure of the key position setting mechanism 28 illustrated in FIG. 3. FIG. 4B is a bottom view in a state in which the key position setting mechanism 28 illustrated in FIG. 4A is operated to set the keytops 24 at the storage position. FIG. 5A is an enlarged perspective view of the keytop 24 at the use position and its surroundings. FIG. 5B is a perspective view of the keytop 24 illustrated in FIG. 5A as seen from the back. The reference signs in the parentheses in Figure FIGS. 5A and 5B indicate the elements corresponding to the left-right direction in the parentheses. For example, a pressed part (33a) in FIG. 5A is an inclined surface that is gradually inclined from bottom to top in the direction from (right) to (left). The reference signs in the parentheses and the left-right direction in FIGS. 6A and 6B have the same relationship.

As illustrated in FIGS. 3 to 5B, the key position setting mechanism 28 includes protrusion pieces 32 and 33 provided at the keytops 24, a set of drive members 34 and 35, a set of link members 36, and a drive mechanism 38.

As illustrated in FIG. 3, basically the protrusion piece 32 is provided at the rear surface 24a of each keytop 24 located immediately in front of the drive member 34. As an exception, the protrusion piece 32 is also provided at a keytop 24A immediately in front of the pointing stick 22 and three keytops 24B at the right front end from among the keytops 24 located immediately behind the drive members 34. The keytops 24A and 24B each have the protrusion piece 32 at its front surface 24b. A keytop 24C in FIG. 3 is an enter key provided in accordance with the specifications of the keyboard device 20, and occupies a space for two keytops in the front-rear direction. The protrusion piece 33 is provided at the rear surface 24a of each keytop 24 located immediately in front of the drive member 35.

One or more protrusion pieces 32 or 33 are provided at the rear surface 24a or front surface 24b of each keytop 24 (24A to 24C). In the structure example illustrated in FIG. 3, the keytops 24 such as alphabet keys each have one protrusion piece 32 or 33, and the keytops 24 which are long in the left-right direction such as a shift key and a space key each have two or more protrusion pieces 32 or 33. Alternatively, for example, the keytops 24 such as alphabet keys may each have a set of protrusion pieces 32 or 33, and the long keytops 24 such as a shift key may each have one protrusion piece 32 or 33.

As illustrated in FIG. 3, the protrusion piece 32 is driven by the drive member 34, and the protrusion piece 33 is driven by the drive member 35. As illustrated in FIGS. 5A and 5B, at the left surface of the protrusion piece 32 corresponding to the drive member 34, a pressed part 32a which is an inclined surface that is gradually inclined from bottom to top in the direction from left to right is provided. The protrusion piece 33 corresponding to the drive member 35 is bilaterally symmetrical with the protrusion piece 32, although not illustrated in detail. That is, at the right surface of the protrusion piece 33, a pressed part 33a which is an inclined surface that is inclined from bottom to top in the direction from right to left is provided.

As illustrated in FIGS. 3 to 4B, the drive members 34 and 35 are located on the top surface 40a side of a support plate 40 of the keyboard device 20. The drive members 34 and 35 are each a prismatic member extending along the left-right arrangement direction of the keytops 24, and are each located to the front or rear of each keytop 24. The drive members 34 and 35 are movable in the left-right direction on the top surface 40a, in a state of being hidden on the bottom surface side of the frame 26. For example, the drive members 34 and 35 are made of a resin material such as POM or a metal material such as aluminum.

The drive member 34 is at an initial position that is leftmost, in a state in which the keytops 24 are at the use position (see FIGS. 3 and 4A). The drive member 34, when subjected to a driving force from the drive mechanism 38 at the initial position, moves to the right, thus depressing the keytops 24 to the storage position (see FIG. 4B). The drive member 34, when subjected to a driving force from the drive mechanism 38 at an endpoint position to which the drive member 34 has moved and that is rightmost, moves to the left, thus returning the keytops 24 to the use position (see FIG. 4A).

The drive member 35 is at an initial position that is rightmost, in a state in which the keytops 24 are at the use position (see FIGS. 3 and 4A). The drive member 35, when subjected to a driving force from the drive member 34 via a link member 36 at the initial position, moves to the left, thus depressing the keytops 24 to the storage position (see FIG. 4B). The drive member 35, when subjected to a driving force from the drive member 34 at an endpoint position to which the drive member 35 has moved and that is leftmost, moves to the right, thus returning the keytops 24 to the use position (see FIG. 4A).

As illustrated in FIGS. 3 to 4B, the pointing stick 22 is located between the drive members 34 and 35 in the fifth row from the rear in the front-rear direction. Thus, in the fifth row, the drive member 34 of short length is located to the right of the pointing stick 22, and the drive member 35 of short length is located to the left of the pointing stick 22. The frontmost drive member 34 only needs to drive the three keytops 24B, and therefore is shorter in length than the drive member 34 in the fifth row.

As illustrated in FIGS. 5A and 5B, the drive member 34 has a protrusion piece 34a at a position facing the protrusion piece 32 of the keytop 24 to be driven. At the right surface of the protrusion piece 34a, a pressing part 34b which is an inclined surface that is gradually inclined from top to bottom in the direction from left to right is provided. The drive member 35 has a protrusion piece 35a at a position facing the protrusion piece 33 of the keytop 24 to be driven, although not illustrated in detail. The protrusion piece 35a is bilaterally symmetrical with the protrusion piece 34a. That is, at the left surface of the protrusion piece 35a, a pressing part 35b which is an inclined surface that is gradually inclined from top to bottom in the direction from right to left is provided.

In a state in which the keytop 24 is at the use position, the pressing part 34b (35b) of the drive member 34 (35) faces the pressed part 32a (33a) of the keytop 24, and the pressed part 32a (33a) is located at the top part of the pressing part 34b (35b). This enables smooth input operation on the keytop 24 to be moved up and down. When the drive member 34 (35) slides to the right (to the left) from this state, the pressing part 34*b* (35*b*) comes into sliding contact with the pressed part 32*a* (33*a*) to depress the pressed part 32*a* (33*a*), thus moving the keytop 24 to the storage position. At the storage position, the pressed part 32*a* (33*a*) is located at a horizontal holding surface 34*c* (35*c*) as a result of passing by the pressing part 34*b* (35*b*) (see FIG. 6B). Consequently, the keytop 24 is reliably held at the storage position.

As illustrated in FIGS. 3 to 4B, the link member 36 connects the left ends of the drive members 34 and 35 adjacent in the front-rear direction, to enable coordinated operation. Specifically, in the structure example illustrated in FIG. 3, three link members 36 are aligned in the front-rear direction. The rearmost link member 36 connects the rearmost drive member 35 and the drive member 34 immediately in front of the drive member 35. The second link member 36 from the rear connects the drive member 34 in the third row from the rear and the drive member 35 immediately in front of the drive member 34. The frontmost link member 36 connects the drive member 35 in the fifth row from the rear and the drive member 34 immediately in front of the drive member 35. The drive member 34 in the fifth row from the rear and the frontmost drive member 34 are used independently, without being connected to the drive member 35. When the drive member 34 moves to the right by the drive mechanism 38, the link member 36, using this moving force, slides the drive member 35 to the left.

Figure 7A:
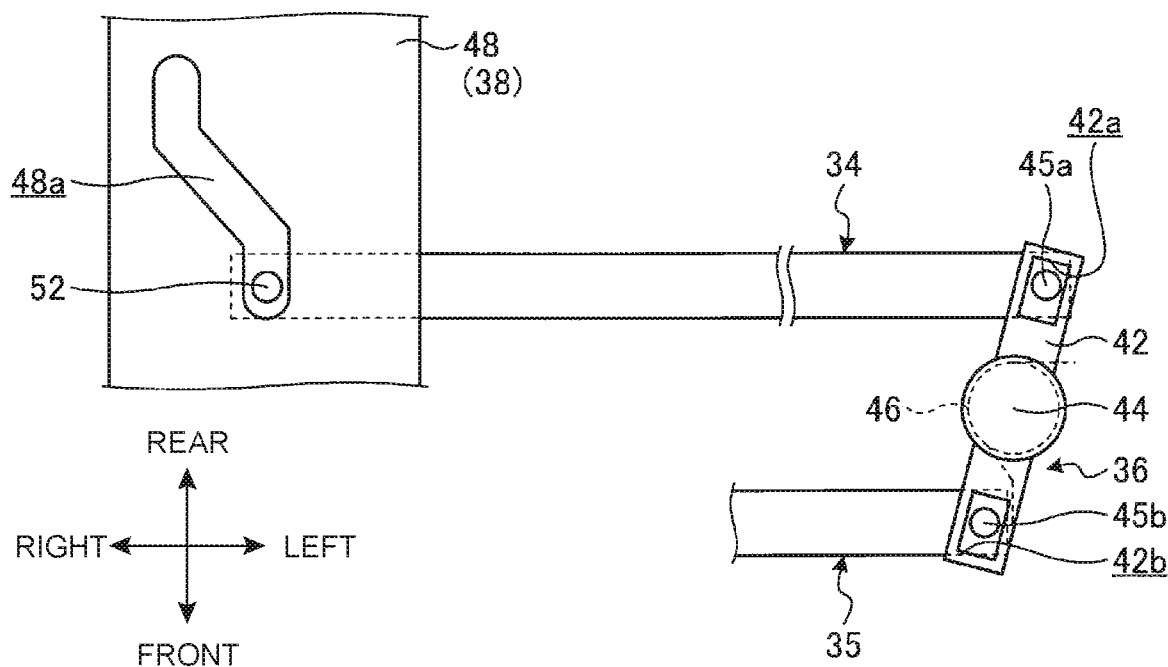
FIG. 7A is a bottom view schematically illustrating the structures of a link member and related elements in a state in which the keytop is at the use position.
Figure 7B:
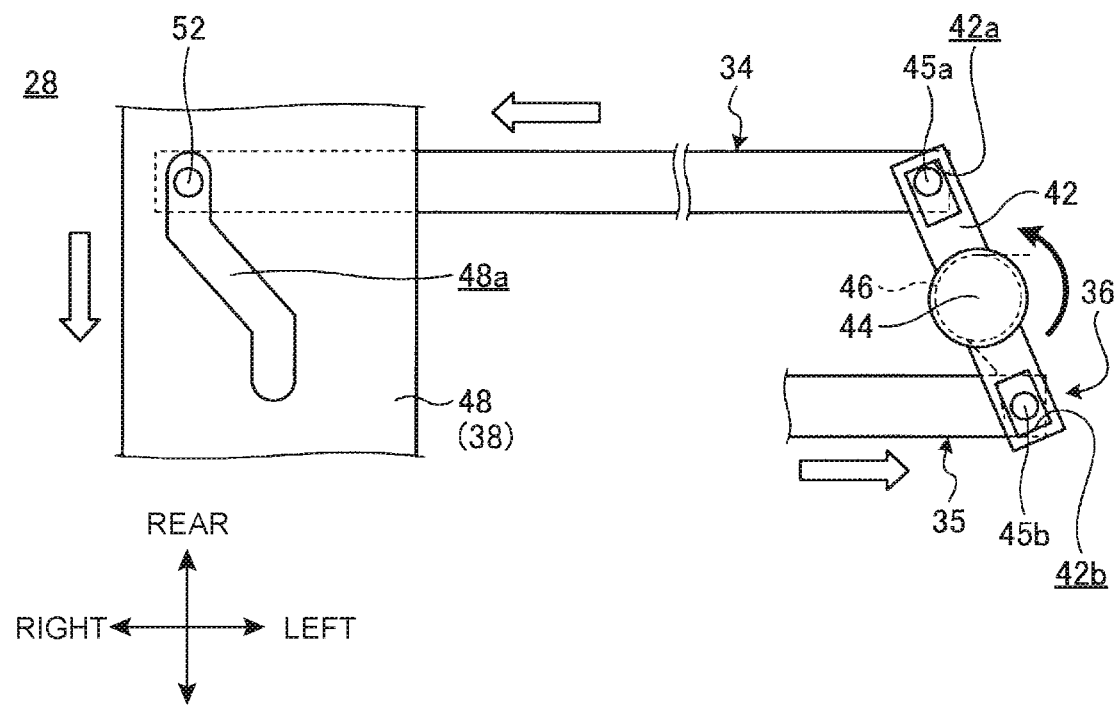
FIG. 7B is a bottom view in a state in which the keytop is set at the storage position from the state illustrated in FIG. 7A by operating the key position setting mechanism.

FIG. 7A is a bottom view illustrating the structures of the link member 36 and related elements in a state in which the keytop 24 is at the use position. FIG. 7B is a bottom view in a state in which the keytop 24 is set at the storage position from the state illustrated in FIG. 7A by operating the key position setting mechanism 28. In FIGS. 7A and 7B, the keytop 24, the pressing part 34*b*, and the like are not illustrated.

As illustrated in FIGS. 7A and 7B, the link member 36 includes a rotation arm 42 and a rotation shaft 44.

The rotation arm 42 is a band plate extending in the front-rear direction. In a state in which the keytop 24 is at each of the use position and the storage position, the rotation arm 42 has a posture that is slightly inclined in the left-right direction from the front-rear direction about the rotation shaft 44 (see FIGS. 3 and 4B). The rotation arm 42 has a hole part 42*a* at one end and a hole part 42*b* at the other end. The hole parts 42*a* and 42*b* are each a long hole along the longitudinal direction of the rotation arm 42.

A first connection shaft 45*a* is inserted in the hole part 42*a* at one end so as to be rotatable and also movable in the longitudinal direction. A second connection shaft 45*b* is inserted in the hole part 42*b* at the other end so as to be rotatable and also movable in the longitudinal direction. The first connection shaft 45*a* is provided at the left end of the drive member 34, and the second connection shaft 45*b* is provided at the left end of the drive member 35. That is, FIG. 7A is an enlarged view of the second link member 36 from the rear in FIG. 4A. The rearmost link member 36 and the frontmost link member 36 in FIG. 4A each have a posture resulting from horizontally flipping the link member 36 of the structure example illustrated in FIG. 7A, where the connection shafts 45*a* and 45*b* and the drive members 34 and 35 are reversed back and forth.

The rotation shaft 44 is a pin along the up-down direction, and is located at the center in the longitudinal direction of the rotation arm 42. The rotation shaft 44 supports the rotation arm 42 rotatably in a horizontal plane parallel to the top surface 40*a* of the support plate 40. The rotation shaft 44 is provided at the main body chassis 16 or the support plate 40. Specifically, for example, the rotation shaft 44 is fixed to the inner surface of the frame 26, the inner surface of the chassis member forming the top surface 16*a* of the main body chassis 16, or the top surface 40*a* of the support plate 40.

Thus, the rotation arm 42 is supported by the rotation shaft 44 so as to be rotatable with respect to the main body chassis 16. For example when the driving-side drive member 34 moves to the left from the state illustrated in FIG. 7A, the hole part 42*a* of the rotation arm 42 is drawn to the left by the first connection shaft 45*a*. Hence, as illustrated in FIG. 7B, the rotation arm 42 rotates in the counterclockwise direction in the drawing, and the hole part 42*b* draws the second connection shaft 45*b*. Consequently, the rotation arm 42 moves the driven-side drive member 35 to the right.

In this embodiment, the rotation arm 42 is constantly biased in the counterclockwise direction in FIG. 7A, for example by a torsion coil spring 46 provided around the rotation shaft 44. That is, the torsion coil spring 46 generates a biasing force in a direction for moving the driving-side drive member 34 to the right and the driven-side drive member 35 to the left, i.e., a direction for depressing each keytop 24 from the use position to the storage position. The torsion coil spring 46 thus aids the power for depressing each keytop 24 to the storage position against the biasing force of a rubber dome 55 (see FIGS. 6A and 6B). Since the drive members 34 and 35 can be reliably moved without the drive mechanism 38 exerting a great force, the device structure can be further reduced in size. The torsion coil spring 46 has the same effect for the stick position setting mechanism 30.

A coil spring 47 designated by dashed-two dotted lines in FIG. 3 may be provided instead of or together with the torsion coil spring 46. The coil spring 47 has the same function as the torsion coil spring 46, and constantly biases, to the front, the below-described slide member 48 located upstream from the rotation arm 42. The torsion coil spring 46 is, however, advantageous in the size reduction of the main body chassis 16 because its installation space is smaller than that of the coil spring 47.

As illustrated in FIGS. 3 to 4B, the drive mechanism 38 is a mechanism that slides the drive member 34 to slide the other drive member 35 via the link member 36. The drive mechanism 38 is also a mechanism that links the rotation operation of the display chassis 14 by the hinges 12 and the operations of the drive members 34 and 35. The drive mechanism 38 includes the slide member 48 and a drive source 50.

The slide member 48 is a long rectangular plate slidable in the front-rear direction with respect to the main body chassis 16. The slide member 48 is located to the right of the keyboard device 20. The slide member 48 includes a set of guide holes 48*a* formed at the positions in the front-rear direction corresponding to the drive members 34, and a rack gear 48*b* extending in the front-rear direction at the front end.

As illustrated in FIGS. 4A, 4B, 7A, and 7B, the guide hole 48*a* has a crank shape that is gradually inclined from right to left in the direction from rear to front. A guide pin 52 provided at the right end of the drive member 34 is inserted in the guide hole 48*a*. The guide pin 52 is movable along the extending direction of the guide hole 48*a*.

In a state in which the keytop 24 is at the use position, the slide member 48 is at an initial position as a result of sliding to a rearmost position, and the guide pin 52 is located at the front end of the guide hole 48*a* (see FIGS. 4A and 7A). When the slide member 48 slides to the front from the initial position, the drive member 34 moves to the right under action of guiding the guide pin 52 by the guide hole 48*a*. When the keytop 24 is at the storage position, the slide member 48 is at an endpoint position as a result of sliding to a frontmost position, and the guide pin 52 is located at the rear end of the guide hole 48*a* (see FIGS. 4B and 7B). On the other hand, when the slide member 48 moves to the rear from the endpoint position toward the initial position, the drive member 34 moves to the left.

The drive source 50 is an electric mechanism in which an electric motor 50*b* and a speed reducer 50*c* are stored in a gear box 50*a*. The speed reducer 50*c* is a gear train having a set of gears engaging with each other, and an output gear 50*d* engages with the rack gear 48*b*. The electric motor 50*b* is electrically connected with a controller 54. The controller 54 receives an angle signal from a hinge angle sensor 56 attached to one of the hinges 12L and 12R, and drives and controls the electric motor 50*b*. The hinge angle sensor 56 is a sensor capable of detecting the rotation angle of the hinge 12L (12R), i.e., the rotation angle of the display chassis 14. For example, the controller 54 may be implemented by a processor such as a central processing unit (CPU) executing a program, i.e., by software, implemented by hardware such as an integrated circuit (IC), or implemented by a combination of software and hardware.

As illustrated in FIGS. 6A and 6B, the support plate 40 in this embodiment has a three-layer structure composed of a base plate 57, a membrane sheet 58 placed on the top surface of the base plate 57, and a backlight sheet 59 placed on the bottom surface of the base plate 57.

The base plate 57 is obtained by subjecting a metal plate such as a thin stainless steel or aluminum plate to cutting and raising or punching, and serves as a plate to which the keytops 24 are attached. All keytops 24 share one base plate 57. The membrane sheet 58 is a switch sheet of a three-layer structure whose contact is closed when pressed, for example. In the case where the membrane sheet 58 is pressed at a position where a fixed contact and a movable contact overlap, the fixed contact and the movable contact attach closely to each other to close the contact. The membrane sheet 58 is not limited to a three-layer structure, and may have, for example, a structure using a contact switch in which a rubber conductive part causes a short circuit. The membrane sheet 58 has a through hole at each location. Through this through hole, a guide mechanism (not illustrated) for guiding up-and-down movement of the keytops 24 lands on the top surface of the base plate 57. The membrane sheet 58 may be placed on the bottom surface of the base plate 57. The backlight sheet 59 irradiates each keytop 24 from the bottom surface side, by guiding and reflecting light emitted from a light source such as an LED element. The backlight sheet 59 may be omitted. A waterproof sheet may be provided instead of the backlight sheet 59.

The keytop 24 is provided above the support plate 40 via the guide mechanism and the rubber dome 55 so as to be movable up and down. The guide mechanism is, for example, a pantograph structure obtained by attaching two frame bodies diagonally. The rubber dome 55 is an elastic member that presses the membrane sheet 58 when the keytop 24 is depressed, and returns the keytop 24 to the original position when the depression operation on the keytop 24 is released. The rubber dome 55 is located between the membrane sheet 58 and the keytop 24. The rubber dome 55 is made of a flexible elastic material such as silicon rubber. The keytop 24 is elastically supported by the rubber dome 55, in a state of being guided by the guide mechanism so as to be movable up and down.

When the keytop 24 is subjected to a depression operation, the operation force elastically deforms the rubber dome 55 and also presses the membrane sheet 58, and the membrane sheet 58 closes the contact. When the depression operation on the keytop 24 is released, the elastic restoring force of the rubber dome 55 returns the keytop 24 to the original position (use position), and the membrane sheet 58 opens the contact.

The operation of the key position setting mechanism 28 having the above-described structure will be described below. In the key position setting mechanism 28, the drive mechanism 38 operates appropriately depending on the rotation angle of the display chassis 14, to move the drive members 34 and 35 via the slide member 48. Consequently, the pressing parts 34*b* and 35*b* of the drive members 34 and 35 press the pressed parts 32*a* and 33*a* of the keytops 24, thus depressing the keytops 24 from the use position to the storage position.

Specifically, in the case where the display chassis 14 is at the 0° position, the slide member 48 in the key position setting mechanism 28 is at the endpoint position as a result of sliding to the frontmost position. In this state, the driving-side drive member 34 is at the endpoint position as a result of moving to the rightmost position, and the driven-side drive member 35 is at the endpoint position as a result of moving to the leftmost position, as illustrated in FIGS. 4B, 6B, and 7B.

Accordingly, the keytop 24 is held at the storage position, with the pressed part 32*a* (33*a*) passing by the pressing part 34*b* (35*b*) and being located at the holding surface 34*c* (35*c*) (see FIG. 6B). Thus, the top surface of the keytop 24 is flush with or slightly lower than the top surface of the frame 26, and the top surface of the keyboard device 20 is flat. Consequently, the display chassis 14 closed with respect to the main body chassis 16 is prevented from interfering with the keytop 24, and the thickness of the electronic apparatus 10 is reduced as much as possible. As illustrated in FIG. 6B, the electronic apparatus 10 has a thin structure in which part of the keytop 24 and the protrusion pieces 32 and 33 are buried in a recess formed in the membrane sheet 58 and the base plate 57 of the support plate 40.

Next, when the display chassis 14 is rotated from the 0° position in the opening direction, the drive mechanism 38 is driven under control of the controller 54 and the slide member 48 slides to the rear, between the 0° position and the 30° position. Thus, the drive member 34 gradually moves to the left, and the drive member 35 gradually moves to the right. Here, since the keytop 24 is subjected to an upward biasing force from the rubber dome 55, the pressed part 32*a* (33*a*) ascends along the pressing part 34*b* (35*b*).

At the 30° position, the slide member 48 is at the initial position as a result of sliding to the rearmost position. Hence, the driving-side drive member 34 is at the initial position as a result of moving to the leftmost position, and the driven-side drive member 35 is at the initial position as a result of moving to the rightmost position, as illustrated in FIGS. 4A, 6A, and 7A. Consequently, the keytop 24 is at the most elevated use position with the pressed part 32*a* (33*a*) being located at the top part of the pressing part 34*b* (35*b*), as illustrated in FIG. 6A. Thus, in the electronic apparatus 10, the keytop 24 is at the use position where the keytop 24 protrudes upward from the top surface of the frame 26 in a stage in which the display chassis 14 is opened to the 30° position, and the keyboard device 20 is usable.

Between the 30° position and the 180° position, the drive mechanism 38 is stopped under control of the controller 54, and the positions of the drive members 34 and 35 in the left-right direction are unchanged. The keytop 24 is therefore maintained at the use position (see FIG. 6A). That is, between the 30° position and the 180° position in which use in the laptop mode is expected, the electronic apparatus 10 is maintained in a state in which the keyboard device 20 is usable.

Between the 180° position and the 270° position, the drive mechanism 38 is driven under control of the controller 54, and the slide member 48 slides to the front. Thus, the drive member 34 gradually moves to the right, and the drive member 35 gradually moves to the left. In the keytop 24, the pressed part 32a (33a) descends along the pressing part 34b (35b) against the biasing force of the rubber dome 55.

At the 270° position, the slide member 48 is at the endpoint position as a result of sliding to the frontmost position. Hence, the driving-side drive member 34 is at the endpoint position as a result of moving to the rightmost position, and the driven-side drive member 35 is at the endpoint position as a result of moving to the leftmost position, as illustrated in FIGS. 4B, 6B, and 7B. Consequently, the keytop 24 is held at the storage position as in the case of the 0° position, as illustrated in FIG. 6B.

Between the 270° position and the 360° position, the drive mechanism 38 is stopped under control of the controller 54, and the positions of the drive members 34 and 35 in the left-right direction are unchanged. The keytop 24 is therefore maintained at the use position (see FIG. 6A). That is, in the electronic apparatus 10, the top surface 16a of the main body chassis 16 serving as the back surface in the tablet mode is flat, with no unevenness caused by the keytop 24. The keyboard device 20 causes no obstruction when the electronic apparatus 10 is used in the tablet mode.

In the case of rotating, in the closing direction, the display chassis 14 that is at the 360° position, the rotation operation is opposite in direction to the rotation operation in the opening direction. In detail, as the display chassis 14 is rotated from the 360° position to the 270° position and then to the 180° position, the keytop 24 ascends gradually. At the 180° position, the keytop 24 returns to the use position. From the 180° position to the 30° position, the use position of the keytop 24 is maintained. As the display chassis 14 is rotated from the 30° position to the 0° position, the keytop 24 descends gradually. At the 0° position, the keytop 24 is again held at the storage position. Consequently, the keytop 24 is flush with or slightly lower than the top surface of the frame 26, and therefore the display chassis 14 can be closed without the display 18 interfering with the keytop 24.

3. Stick Position Setting Mechanism

Figure 8:
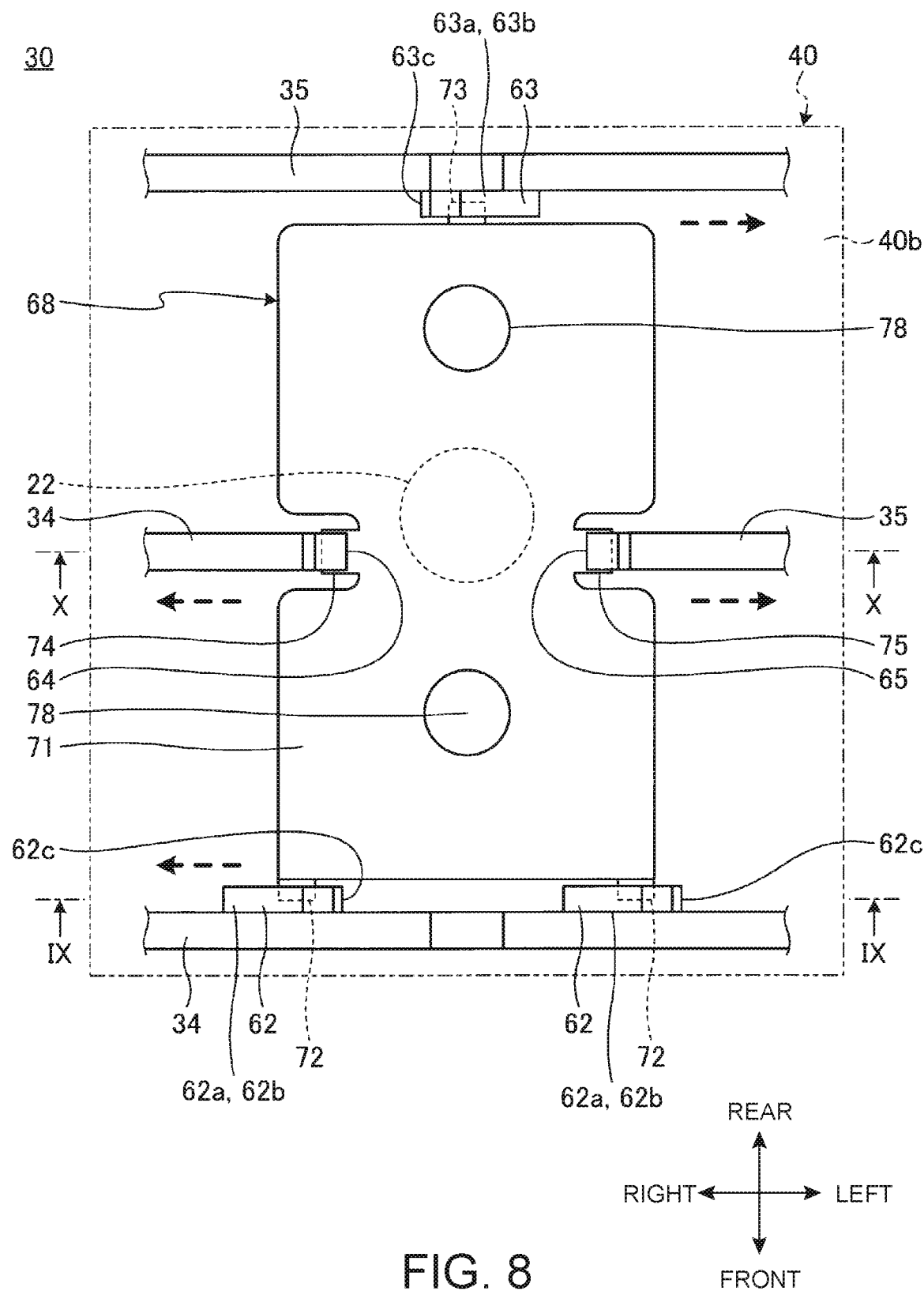
FIG. 8 is a principal part enlarged bottom view illustrating the structure of a stick position setting mechanism that moves a pointing stick up and down.
Figure 9A:
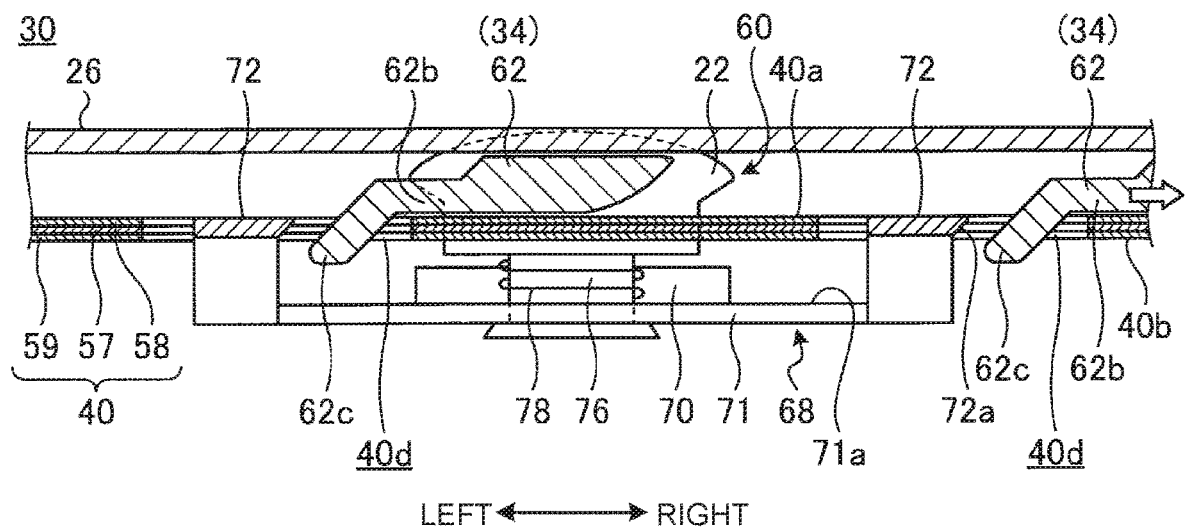
FIG. 9A is a sectional view along IX-IX line in FIG. 8 in a state in which the pointing stick is at a lowered position.
Figure 9B:
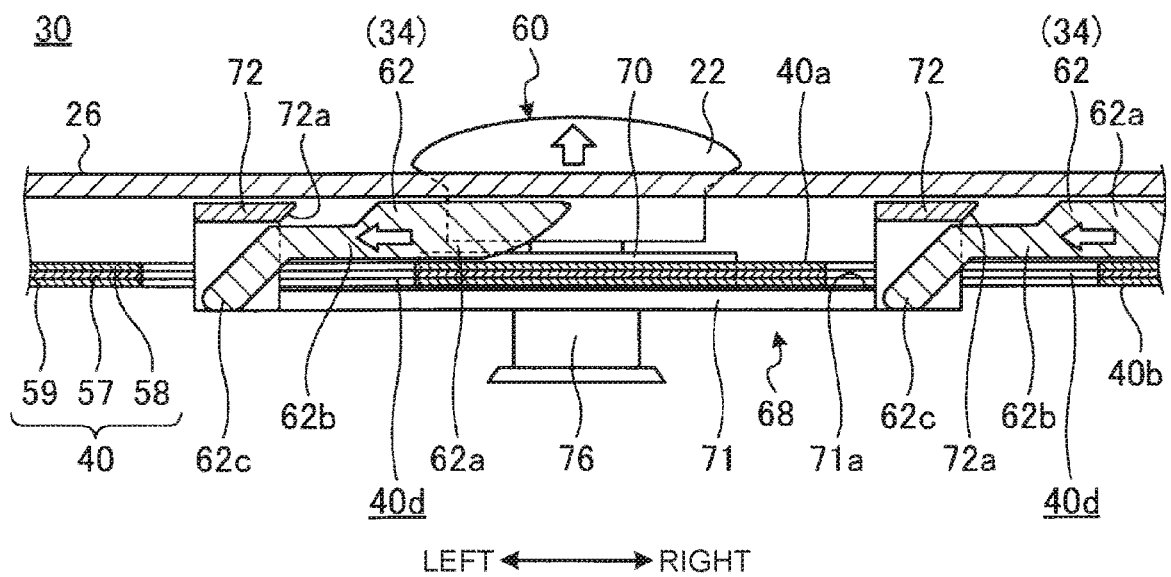
FIG. 9B is a sectional view illustrating a state immediately after the movement of the pointing stick from the lowered position illustrated in FIG. 9A to an elevated position.
Figure 9C:
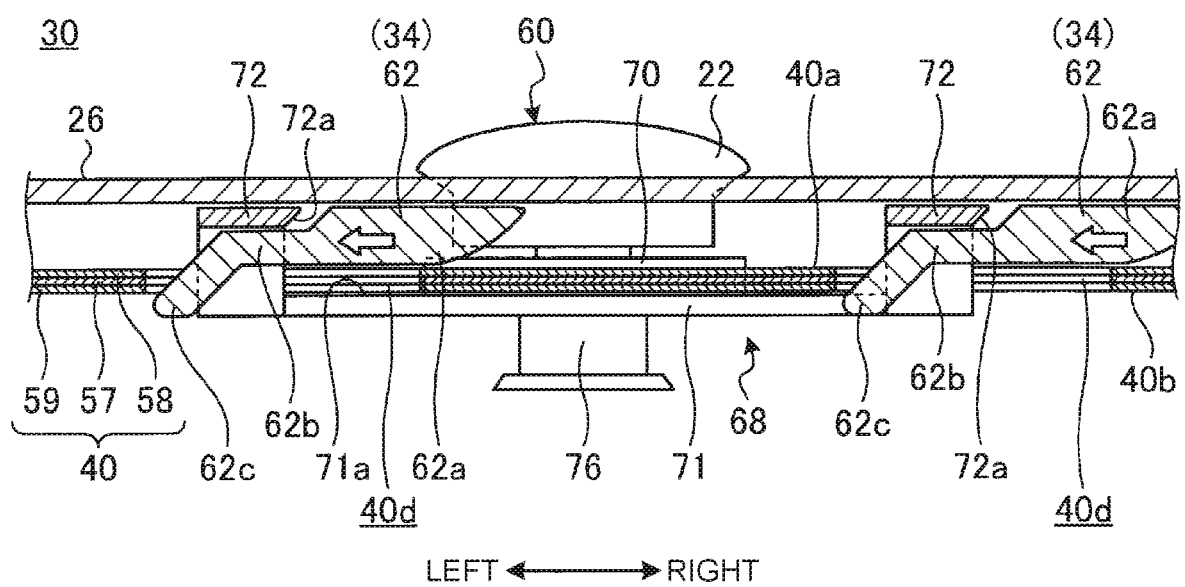
FIG. 9C is a sectional view illustrating a state in which the pointing stick is set at the lowered position.
Figure 10A:
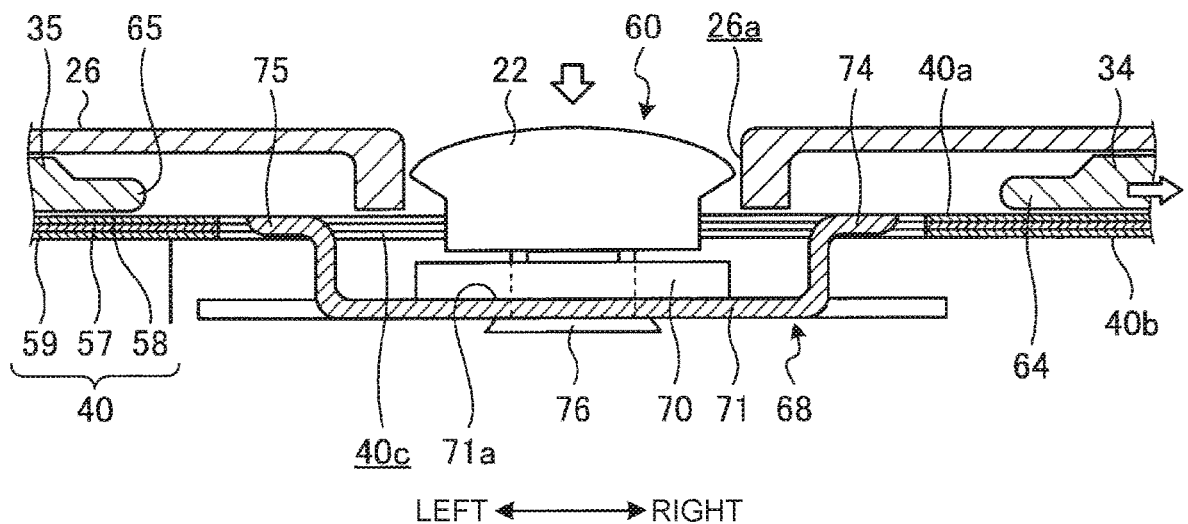
FIG. 10A is a sectional view along X-X line in FIG. 8 in a state in which the pointing stick is at a lowered position.
Figure 10B:
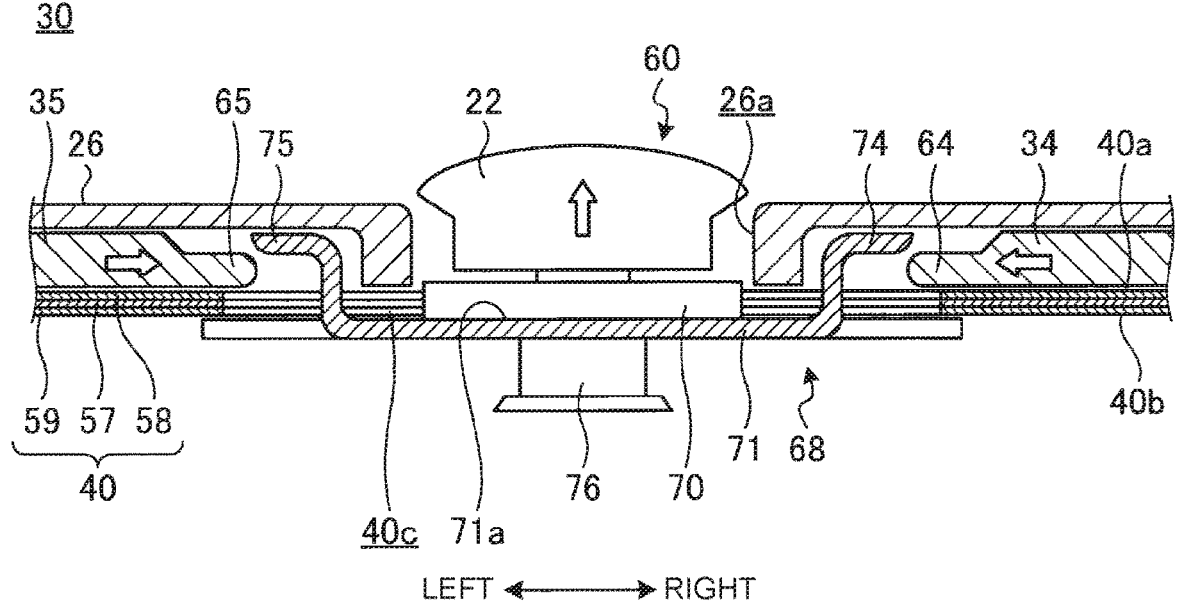
FIG. 10B is a sectional view illustrating a state immediately after the movement of the pointing stick from the lowered position illustrated in FIG. 10A to an elevated position.
Figure 10C:
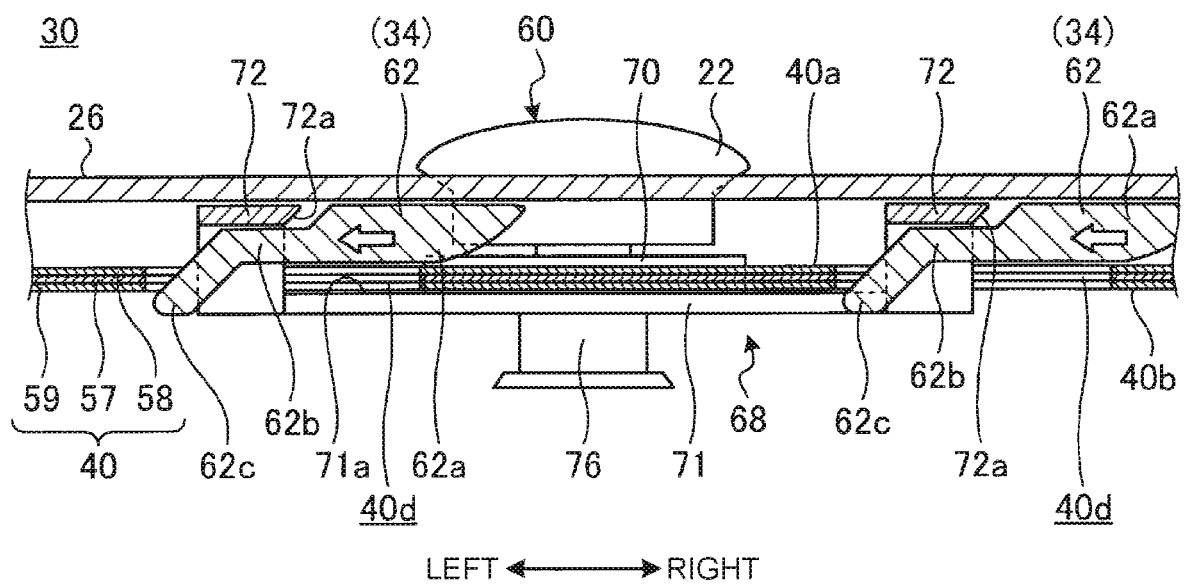
FIG. 10C is a sectional view illustrating a state in which the pointing stick is set at the lowered position.

An example of the structure of the stick position setting mechanism 30 that sets the pointing stick 22 at the lowered position will be described below. FIG. 8 is a principal part enlarged bottom view illustrating the structure of the stick position setting mechanism 30 that moves the pointing stick 22 up and down. FIGS. 9A to 9C are sectional views along IX-IX line in FIG. 8. FIGS. 10A to 10C are sectional views along X-X line in FIG. 8. In FIGS. 9A to 10C, the frame 26 side is the upper side in the drawing. FIGS. 9A and 10A illustrate a state in which the pointing stick 22 is at the lowered position. FIGS. 9B and 10B illustrate a state immediately after the pointing stick 22 moves from the lowered position to the elevated position. FIGS. 9C and 10C illustrate a state in which the pointing stick 22 is at the elevated position.

As illustrated in FIGS. 8 to 10C, the stick position setting mechanism 30 includes a pointing stick device 60, pressing parts 62 and 63 provided at the drive members 34 and 35, and support pieces 64 and 65 provided at the drive members 34 and 35 located to sandwich the pointing stick 22 from the left and the right.

The pointing stick device 60 includes the pointing stick 22, a base member 68, and a sensor substrate 70. The pointing stick device 60 has the base member 68 located on the bottom surface 40b side of the support plate 40, and the pointing stick 22 protruding to the top surface 40a side through a hole part 40c of the support plate 40 (see FIG. 10A). The pointing stick 22 further passes through a hole part 26a of the frame 26 (see FIG. 10A) and is exposed at the top surface 16a of the main body chassis 16.

The pointing stick 22 is a mushroom-type member made of, for example, a resin material or a hard rubber material. The lower part of the pointing stick 22 is connected to the sensor substrate 70 provided at the top surface of the base member 68. The sensor substrate 70 is a control board of the pointing stick 22. The pointing stick device 60 is a module structure in which the pointing stick 22 is, in a state of being electrically connected to the sensor substrate 70, fixed integrally with the base member 68. The sensor substrate 70 is connected with wiring from a motherboard and the like in the main body chassis 16.

The base member 68 has a plate part 71 which is an approximately rectangular metal plate recessed at the center in the front-rear direction of the left and right edges. The plate part 71 has pressed parts 72 and 73 and support parts 74 and 75 formed by cutting and raising or punching. As illustrated in FIGS. 8, 9A, and 10A, the plate part 71 is a platelike portion occupying the large part of the base member 68, and is located below the bottom surface 40b of the support plate 40.

As illustrated in FIGS. 8 and 9A, the pressed part 72 is a protrusion piece protruding from the front edge of the base member 68 facing the drive member 34. In this embodiment, a pair of left and right pressed parts 72 are provided. The pressed part 72 rises upward from the plate part 71, and protrudes on the top surface 40a side through the hole part 40d of the support plate 40. At the right surface of the pressed part 72, an inclined surface 72a that is gradually inclined from top to bottom in the direction from right to left is provided. The inclined surface 72a faces the pressing part 62 of the drive member 34 located immediately in front of the base member 68.

The pressed part 73 is a protrusion piece protruding from the rear edge of the base member 68 facing the drive member 35. The pressed part 73 is bilaterally symmetrical with the pressed part 72. That is, the pressed part 73 protrudes on the top surface 40a side through the hole part 40d. At its left surface, an inclined surface that is gradually inclined from top to bottom in the direction from left to right is provided. Although the inclined surface of the pressed part 73 is not illustrated, the inclined surface of the pressed part 73 is bilaterally symmetrical with the inclined surface 72a illustrated in FIG. 9A. The inclined surface of the pressed part 73 faces the pressing part 63 of the drive member 35 located immediately behind the base member 68.

As illustrated in FIGS. 8 and 10A, the support part 74 is provided in a recessed portion at the right edge of the plate part 71. The support part 74 rises upward from the plate part 71, and protrudes on the top surface 40a side through the hole part 40c of the support plate 40. The support part 74 faces a support piece 64 provided at the left end of the drive member 34 in the fifth row from the rear, i.e. the drive member 34 located to the right of the pointing stick 22.

The support part 74 is provided in a recessed portion at the left edge of the plate part 71. The support part 75 is bilaterally symmetrical with the support part 74. In detail, the support part 75 protrudes on the top surface 40a side through the hole part 40c. The support part 75 faces a support piece 65 provided at the right end of the drive member 35 in the fifth row from the rear, i.e. the drive member 35 located to the left of the pointing stick 22.

As illustrated in FIGS. 8 to 10C, the base member 68 has a pair of front and rear hole parts in the plate part 71, and a guide pole 76 is inserted through each hole part. The guide pole 76 supports the base member 68 so as to be movable up and down. The guide pole 76 is a cylinder that is provided in the base plate 57 and protrudes downward from the bottom surface 40b of the support plate 40. As illustrated in FIG. 9C, a coil spring 78 is provided around the guide pole 76. The coil spring 78 is located between the bottom surface 40b of the support plate 40 and the top surface 71a of the plate part 71. The coil spring 78 constantly biases the base member 68 (pointing stick device 60) downward with respect to the support plate 40. That is, the pointing stick device 60 is constantly biased in the direction from the elevated position to the lowered position by the coil spring 78. A flange for retaining the base member 68 is provided at the bottom end of the guide pole 76.

As illustrated in FIGS. 8 and 9A, the pressing part 62 is a protrusion piece protruding from the rear surface of the drive member 34 immediately in front of the base member 68. In this embodiment, a pair of left and right pressing parts 62 are provided. The pressing part 62 includes a main body part 62a, a holding part 62b, and an inclined part 62c, and has an approximately boomerang shape in a side view in FIG. 9A. The main body part 62a is located between the top surface 40a of the support plate 40 and the frame 26. The holding part 62b protrudes to the left from the main body part 62a, and its top surface is one level lower than the main body part 62a. The holding part 62b can enter the space between the bottom surface of the pressed part 72 of the base member 68 and the top surface 40a of the support plate 40. The inclined part 62c bends diagonally downward while protruding to the left from the holding part 62b, and its top surface is an inclined surface that can press the pressed part 72.

The pressing part 63 is a protrusion piece protruding from the front surface of the drive member 35 immediately behind the base member 68. The pressing part 63 is bilaterally symmetrical with the pressing part 62. In detail, the pressing part 63 includes a main body part 63a, a holding part 63b, and an inclined part 63c (see FIG. 8). The holding part 63b protrudes to the right from the main body part 63a. The inclined part 63c bends diagonally downward while protruding to the right from the holding part 63b.

As illustrated in FIGS. 8 and 10A, the support piece 64 is a part formed by lowering the top surface of the left end of the drive member 34 by one level and shaping the tip like an arc. The support piece 64 can enter the space between the bottom surface of the support part 74 of the base member 68 and the top surface 40a of the support plate 40.

The support piece 65 is a part formed by lowering the top surface of the right end of the drive member 35 by one level and shaping the tip like an arc. The support piece 65 is bilaterally symmetrical with the support piece 64, and faces the support piece 64 with the pointing stick device 60 therebetween. The support piece 65 can enter the space between the bottom surface of the support part 75 of the base member 68 and the top surface 40a of the support plate 40.

The operation of the stick position setting mechanism 30 having the above-described structure will be described below. In the stick position setting mechanism 30, the drive mechanism 38 operates appropriately depending on the rotation angle of the display chassis 14, to move the drive members 34 and 35 via the slide member 48. Consequently, the pressing parts 62 and 63 of the drive members 34 and 35 press the pressed parts 72 and 73 of the pointing stick device 60, thus depressing the pointing stick device 60 from the lowered position to the elevated position. The operation of the drive mechanism 38 in the stick position setting mechanism 30 is the same as the operation in the key position setting mechanism 28, and accordingly detailed description is omitted here.

Specifically, in the case where the display chassis 14 is at the 0° position, in the stick position setting mechanism 30, the driving-side drive member 34 is at the endpoint position as a result of moving to the rightmost position, and the driven-side drive member 35 is at the endpoint position as a result of moving to the leftmost position, as illustrated in FIGS. 4B, 9A, and 10A.

Hence, the stick position setting mechanism 30 is at a position where the pressing part 62 (63) retracts from the pressed part 72 (73) and the support piece 64 (65) retracts from the support part 74 (75). The pointing stick device 60 is therefore at a lowered position where the pointing stick device 60 is lowered most by the biasing force of the coil spring 78, the top of the pointing stick 22 is approximately flush with or lower than the top surface of the frame 26, and the top surface of the keyboard device 20 is flat. Consequently, the display chassis 14 closed with respect to the main body chassis 16 is prevented from interfering with the pointing stick 22, and the thickness of the electronic apparatus 10 is reduced as much as possible.

Next, when the display chassis 14 is rotated from the 0° position in the opening direction, between the 0° position and the 30° position, the drive member 34 gradually moves to the left, and the drive member 35 gradually moves to the right (see FIGS. 9B and 10B). Accordingly, first the inclined part 62c (63c) of the pressing part 62 (63) presses the pressed part 72 (73) to elevate the pointing stick device 60 against the biasing force of the coil spring 78, as illustrated in FIGS. 9A to 9B.

As illustrated in FIG. 9B, when the pressing part 62 (63) lifts the pressed part 72 (73) to a topmost position, the top surface of the holding part 62b (63b) supports the pressed part 72 (73). In this state, in the stick position setting mechanism 30 the support piece 64 (65) does not yet support the support part 74 (75), as illustrated in FIG. 10B. That is, the stick position setting mechanism 30 performs a time difference operation by which the support piece 64 (65) enters the bottom surface side of the support part 74 (75) a predetermined time after the operation of lifting the pressed part 72 (73) by the pressing part 62 (63) is completed. This prevents failures such as the support pieces 64 and 65 erroneously coming into contact with the support parts 74 and 75 or running onto the top surfaces of the support parts 74 and 75 before the pressed parts 72 and 73 are lifted by the pressing parts 62 and 63 due to factors such as manufacturing errors or assembling errors of the elements in the stick position setting mechanism 30.

At the 30° position, the driving-side drive member 34 is at the initial position as a result of moving to the leftmost position, and the driven-side drive member 35 is at the initial position as a result of moving to the rightmost position, as illustrated in FIGS. 4A, 9C, and 10C. Consequently, the pointing stick device 60 is at an elevated position where the pointing stick device 60 is elevated most against the biasing force of the coil spring 78. In this state, the holding part 62b (63b) of the pressing part 62 (63) enters deepest into the space on the bottom surface side of the pressed part 72 (73) (see FIG. 9C). Further, the support piece 64 (65) enters deepest into the space on the bottom surface side of the support part 74 (75), and the top surface of the support piece 64 (65) supports the support part 74 (75). Thus, in the electronic apparatus 10, the pointing stick 22 is firmly held at the elevated position where the pointing stick 22 protrudes upward from the top surface of the frame 26 in a stage in which the display chassis 14 is opened to the 30° position, and the pointing stick 22 is usable.

Between the 30° position and the 180° position, the positions of the drive members 34 and 35 in the left-right direction are unchanged. The pointing stick 22 in the pointing stick device 60 is maintained at the elevated position in the laptop mode, and can be used smoothly.

Between the 180° position and the 270° position, the drive member 34 gradually moves to the right, and the drive member 35 gradually moves to the left. Hence, the pressing part 62 (63) gradually separates from the pressed part 72 (73), and the support piece 64 (65) gradually separates from the support part 74 (75). At the 270° position, the driving-side drive member 34 is at the endpoint position as a result of moving to the rightmost position, and the driven-side drive member 35 is at the endpoint position as a result of moving to the leftmost position, as illustrated in FIG. 4B. Consequently, the pointing stick 22 is held at the lowered position as in the case of the 0° position, as illustrated in FIGS. 9A and 10A.

Between the 270° position and the 360° position, the positions of the drive members 34 and 35 in the left-right direction are unchanged. The pointing stick 22 is therefore maintained at the lowered position. Thus, in the electronic apparatus 10, the pointing stick 22 does not protrude at the top surface 16a of the main body chassis 16 in the tablet mode, and accordingly causes no obstruction at the chassis back surface.

In the case of rotating, in the closing direction, the display chassis 14 that is at the 360° position, the rotation operation is opposite in direction to the rotation operation in the opening direction. In detail, as the display chassis 14 is rotated from the 360° position to the 270° position and then to the 180° position, the pointing stick 22 ascends gradually. At the 180° position, the pointing stick 22 returns to the elevated position. From the 180° position to the 30° position, the elevated position of the pointing stick 22 is maintained. As the display chassis 14 is rotated from the 30° position to the 0° position, the pointing stick 22 descends gradually. At the 0° position, the pointing stick 22 is again held at the lowered position. Consequently, the pointing stick 22 is flush with or slightly lower than the top surface of the frame 26, and therefore the display chassis 14 can be closed without the display 18 interfering with the pointing stick 22.

4. Modifications of Link Member

Figure 11A:
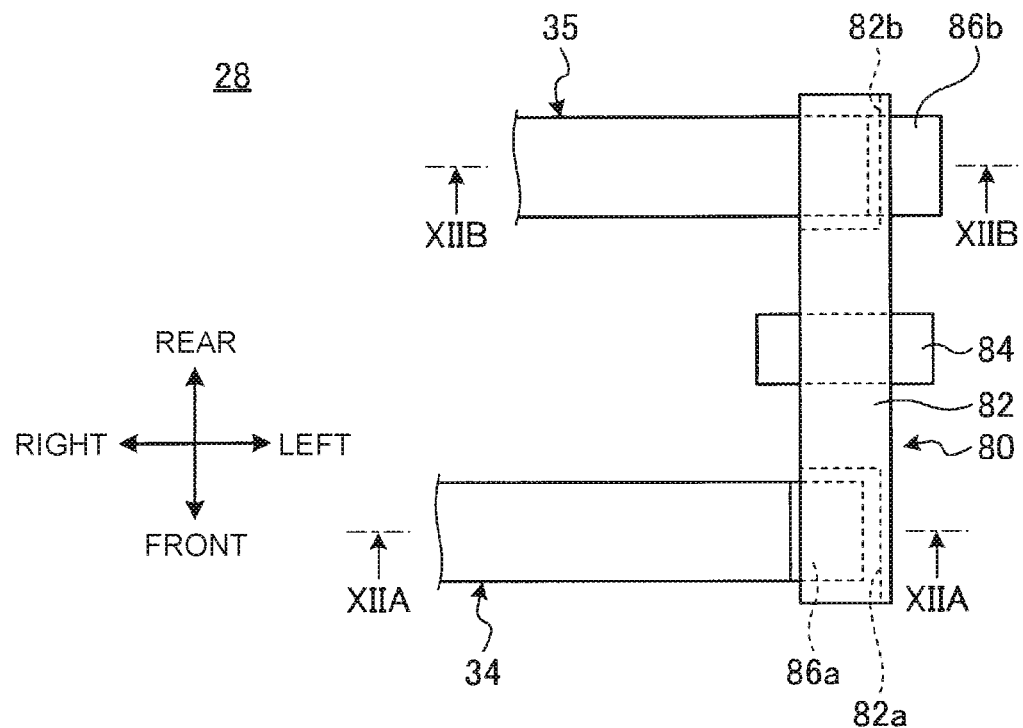
FIG. 11A is a principal part enlarged bottom view schematically illustrating the state of a link member according to a first modification and related elements in a state in which the keytops are at a use position.
Figure 11B:
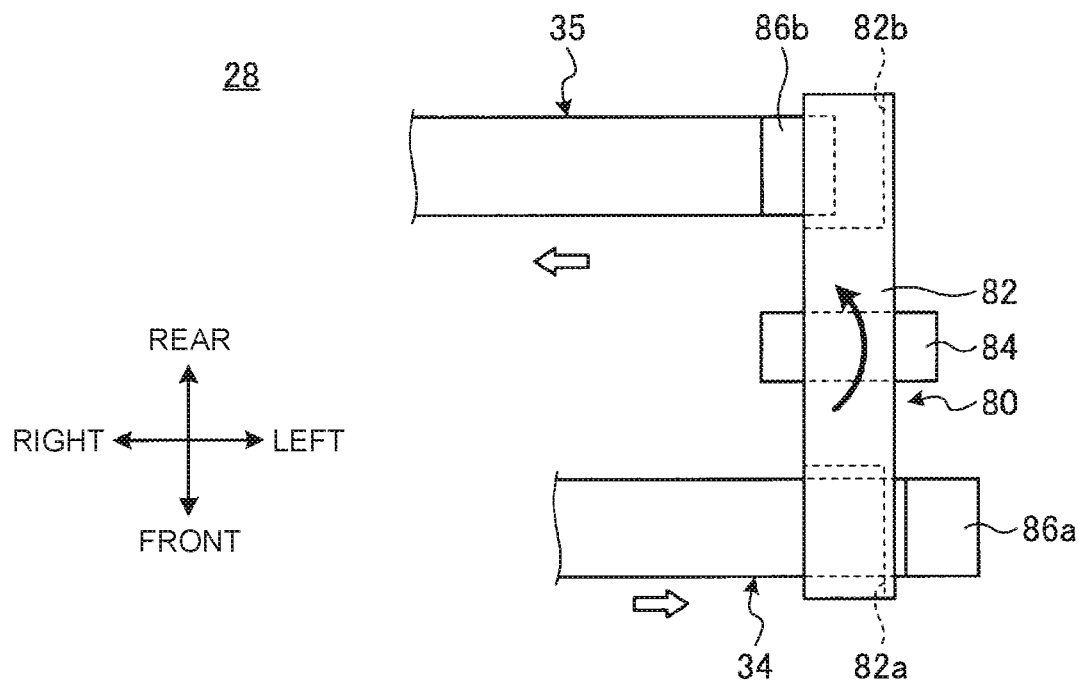
FIG. 11B is a principal part enlarged bottom view in a state in which the drive member is moved from the state illustrated in FIG. 11A.
Figure 12A:
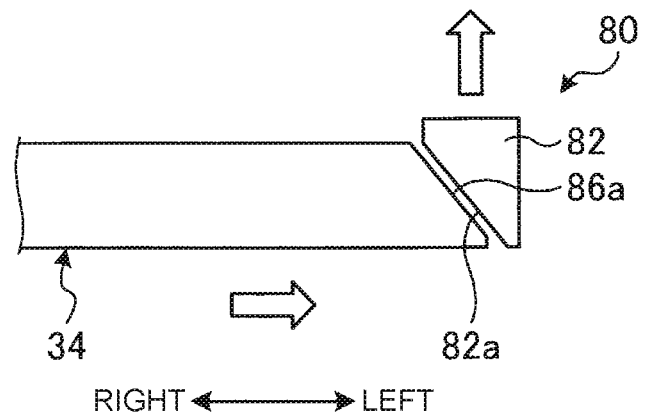
FIG. 12A is a sectional view along XIIA-XIIA line in FIG. 11A.
Figure 12B:
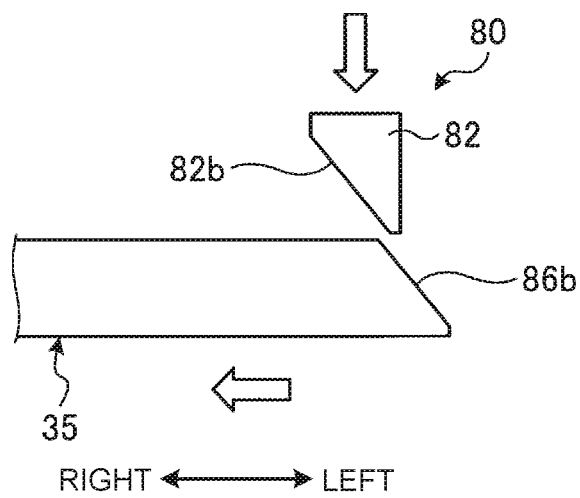
FIG. 12B is a sectional view along XIIB-XIIB line in FIG. 11A.

FIG. 11A is a principal part enlarged bottom view illustrating the state of a link member 80 according to a first modification and related elements in a state in which the keytops 24 are at the use position. FIG. 11B is a principal part enlarged bottom view in a state in which the drive member 34 is moved from the state illustrated in FIG. 11A. FIG. 12A is a sectional view along XIIA-XIIA line in FIG. 11A. FIG. 12B is a sectional view along XIIB-XIIB line in FIG. 11A.

As illustrated in FIGS. 11A to 12B, the link member 80 includes a seesaw arm 82 and a rotation shaft 84. The seesaw arm 82 is a rod-like member extending in the front-rear direction. The seesaw arm 82 has a pressed surface 82a formed at the end on the drive member 34 side, and a pressing surface 82b formed at the end on the drive member 35 side. The pressed surface 82a and the pressing surface 82b are each an inclined surface that is gradually inclined from top to bottom in the direction from right to left (see FIGS. 12A and 12B). The rotation shaft 84 is located at the center in the longitudinal direction of the seesaw arm 82, and supports the seesaw arm 82 rotatably in a vertical plane orthogonal to the top surface 40a of the support plate 40. The rotation shaft 84 is fixed to the main body chassis 16 or the support plate 40.

The drive members 34 and 35 used together with the link member 80 has inclined surfaces 86a and 86b, instead of the connection shafts 45a and 45b. The inclined surfaces 86a and 86b are located at the left end of the drive members 34 and 35, and are each gradually inclined from top to bottom in the direction from right to left. The inclined surface 86a is slidable with the pressed surface 82a, and the inclined surface 86b is slidable with the pressing surface 82b.

In a state in which the keytop 24 is at the use position, the seesaw arm 82 has an inclined posture in which the pressed surface 82a descends and the pressing surface 82b ascends about the rotation shaft 84 (see FIG. 12A). When the drive member 34 moves to the left in this state, the pressed surface 82a is pressed by the inclined surface 86a and ascends. Consequently, the pressing surface 82b descends and presses the inclined surface 86b, to move the drive member 35 to the right.

In the structure example illustrated in FIGS. 11A to 12B, the drive member 34 moves from right to left when setting the keytop 24 at the storage position from the use position. Accordingly, the guide hole 48a of the drive mechanism 38 is bilaterally symmetrical with the shape illustrated in FIG. 4A or 7A as an example. The same applies to the structure example illustrated in FIGS. 13A and 13B.

Figure 13A:
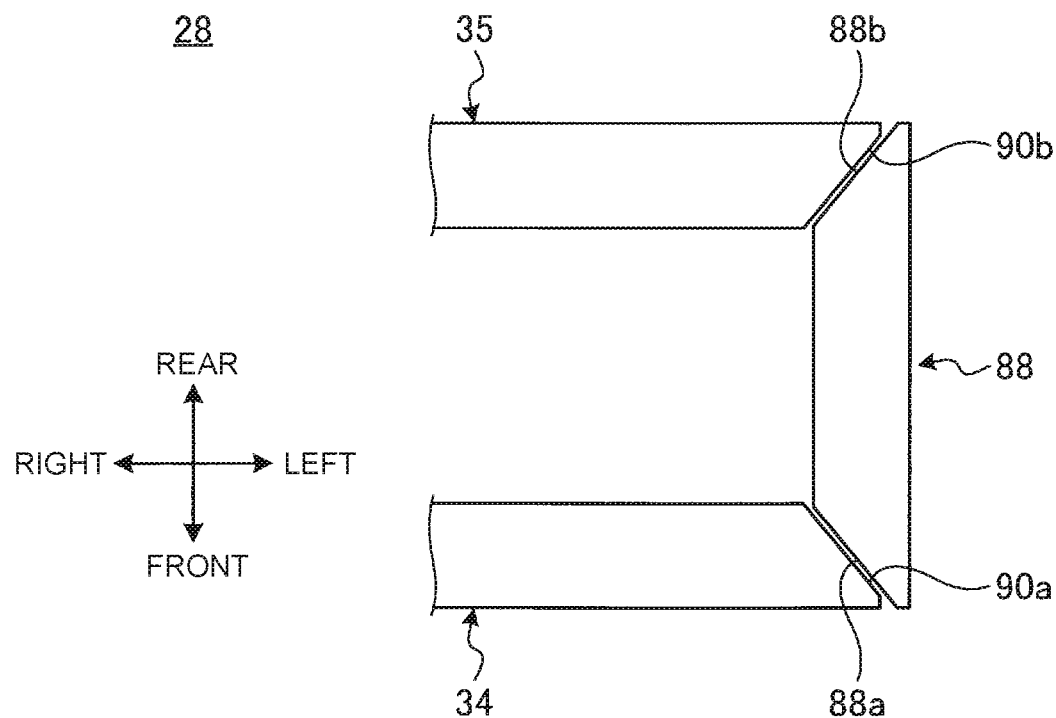
FIG. 13A is a principal part enlarged bottom view illustrating the state of a link member according to a second modification and related elements in a state in which the keytops are at a use position.
Figure 13B:
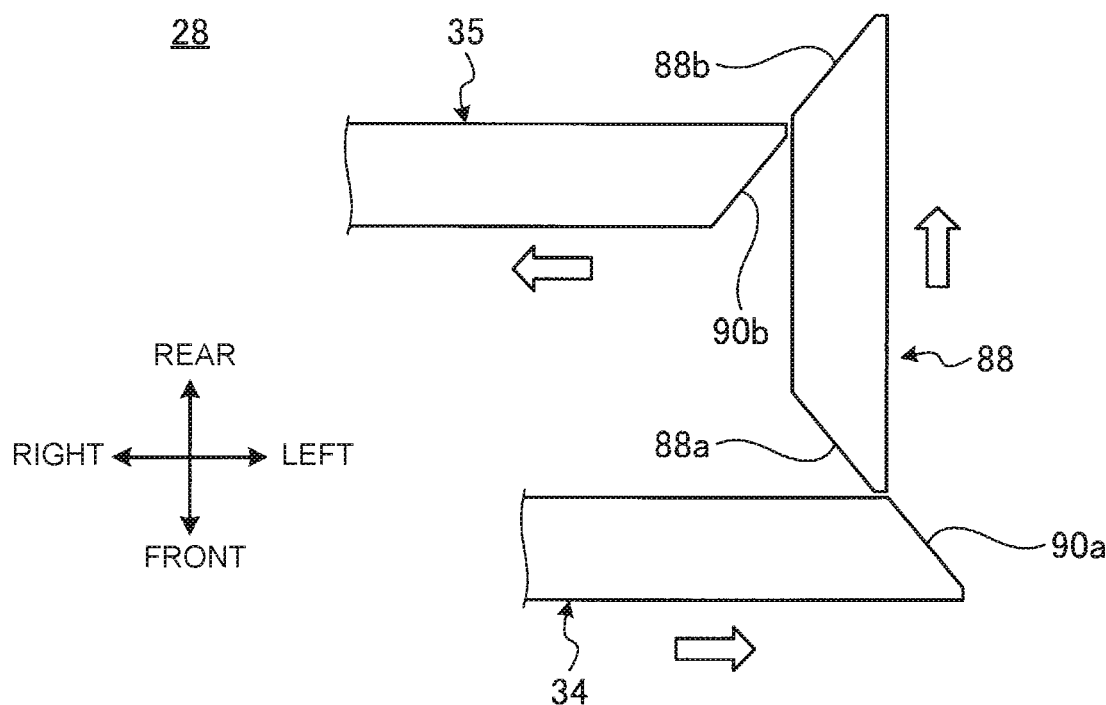
FIG. 13B is a principal part enlarged bottom view in a state in which the drive member is moved from the state illustrated in FIG. 13A.

FIG. 13A is a principal part enlarged bottom view illustrating the state of a link member 88 according to a second modification and related elements in a state in which the keytops 24 are at the use position. FIG. 13B is a principal part enlarged bottom view in a state in which the drive member 34 is moved from the state illustrated in FIG. 13A.

As illustrated in FIGS. 13A and 13B, the link member 88 is a rod-like member supported slidably in the front-rear direction with respect to the main body chassis 16 or the support plate 40. The link member 88 has a pressed surface 88a formed at the end on the drive member 34 side, and a pressing surface 88b formed at the end on the drive member 35 side. The pressed surface 88a is an inclined surface that is gradually inclined from the drive member 35 side to the drive member 34 side in the direction from right to left. The pressing surface 88b is an inclined surface that is gradually inclined from the drive member 34 side to the drive member 35 side in the direction from right to left.

The drive members 34 and 35 used together with the link member 88 have inclined surfaces 90a and 90b, instead of the connection shafts 45a and 45b. The inclined surface 90a is located at the left end of the drive member 34, and slidably faces the pressed surface 88a.

The inclined surface 90b is located at the left end of the drive member 35, and slidably faces the pressing surface 88b. The inclined surface 90a is an inclined surface that is gradually inclined from the drive member 35 side to the drive member 34 side in the direction from right to left. The inclined surface 90b is an inclined surface that is gradually inclined from the drive member 34 side to the drive member 35 side in the direction from right to left.

In a state in which the keytop 24 is at the use position, the link member 88 is at a position where the pressed surface 88a faces the inclined surface 90a and the pressing surface 88b faces the inclined surface 90b (see FIG. 13A). When the drive member 34 moves to the left in this state, the inclined surface 90a presses the pressed surface 88a, and the link member 88 slides to the drive member 35 side (rearward in the drawing). Consequently, the pressing surface 88b presses the inclined surface 90b, to move the drive member 35 to the right.

Figure 14:
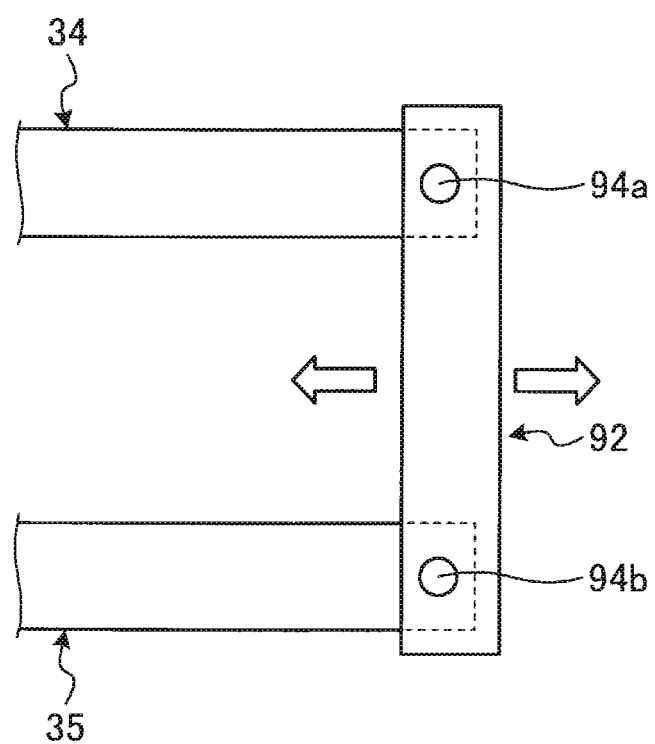
FIG. 14 is a principal part enlarged bottom view illustrating the state of a link member according to a third modification and related elements.

FIG. 14 is a principal part enlarged bottom view illustrating the state of a link member 92 according to a third modification and related elements.

As illustrated in FIG. 14, the link member 92 is a band plate supported slidably in the left-right direction with respect to the main body chassis 16 or the support plate 40. The end of the link member 92 on the drive member 34 side is fixed by the drive member 34 and a fixing part 94a, and the end of the link member 92 on the drive member 35 side is fixed by the drive member 35 and a fixing part 94b.

The link member 92 integrally connects the adjacent drive members 34 and 35, and moves the drive members 34 and 35 in the left-right direction simultaneously. For example, when the drive member 34 moves to the left by the drive mechanism 38, the drive member 35 moves to the left via the link member 92. Therefore, in the key position setting mechanism 28 using the link member 92, the inclination directions of the pressed parts 32a and 33a are preferably the same, and the inclination directions of the pressing parts 34b and 35b are preferably the same. In the stick position setting mechanism 30 using the link member 92, the inclination directions of the pressed parts 72 and 73 are preferably the same, and the inclination directions of the pressing parts 62 and 63 are preferably the same. Further, the inclination directions of the support parts 74 and 75 are preferably the same, and the inclination directions of the support pieces 64 and 65 are preferably the same. For example, in the case where the support piece 65 is formed in reverse direction in FIG. 8, an opening is formed in the base member 68, the support part 75 is formed at the edge of the opening, and the support piece 65 faces the support part 75 through the opening.

As described above, the electronic apparatus 10 in this embodiment includes the drive members 34 and 35, the link member 36 (80, 88, 92) that connect the adjacent drive members 34 and 35 to enable coordinated operation, and the drive mechanism 38 that moves one of the drive members 34 and 35 connected by the link member 36 (80, 88, 92). In the key position setting mechanism 28, the keytop 24 includes the pressed parts 32a and 32b, and the drive members 34 and 35 include the pressing parts 34b and 35b that press the pressed parts 32a and 33a to move the keytop 24 to the storage position. In the stick position setting mechanism 30, the base member 68 includes the pressed parts 72 and 73, and the drive members 34 and 35 include the pressing parts 62 and 63 that press the pressed parts 72 and 73 to move the pointing stick device 60 to the elevated position.

Thus, in the electronic apparatus 10, simply by moving the drive members 34 and 35, the keytops 24 or the pointing stick can be lowered and stored in the chassis when not in use. Hence, the main body chassis 16 can be reduced in thickness or size. The electronic apparatus 10 includes the link member 36 (80, 88, 92) that connects the adjacent drive members 34 and 35 to enable coordinated operation. When the drive mechanism 38 directly moves only the drive member 34 from among the drive members 34 and 35, the other drive member 35 moves via the link member 36 or the like. Thus, the structure of the drive mechanism 38 can be simplified to reduce the installation space in the main body chassis 16, so that the main body chassis 16 can be further reduced in thickness or size.

In particular, the drive mechanism 38 in the electronic apparatus 10 includes the slide member 48 that is located at the other end of the drive members 34 and 35 opposite to the link member 36 or the like and can press the drive member 34, and the drive source 50 that moves the slide member 48. Thus, the drive mechanism 38 can smoothly move all drive members 34 and 35 by a simple structure composed of one slide member 48 and drive source 50. The installation space for the drive mechanism 38 in the main body chassis 16 can therefore be further reduced.

The electronic apparatus 10 includes the key position setting mechanism 28 that moves the keytops 24 to the storage position and the stick position setting mechanism 30 that moves the pointing stick device 60 to the elevated position. These mechanisms 28 and 30 share the drive members 34 and 35. Hence, even in the case where the electronic apparatus 10 includes both the key position setting mechanism 28 and the stick position setting mechanism 30, the structure of the apparatus as a whole can be simplified, achieving further size reduction.

In the stick position setting mechanism 30, when moving the pointing stick device 60 to the elevated position, the pressed parts 72 and 73 at the front and rear edges are respectively pressed by the pressing parts 62 and 63. The pointing stick device 60 accordingly ascends stably without inclination and the like. In the stick position setting mechanism 30, when setting the pointing stick device 60 at the elevated position, the pressed parts 72 and 73 at the front and rear edges are respectively supported by the pressing parts 62 and 63, and also the intermediate support parts 74 and 75 in the front-rear direction are supported by the support pieces 64 and 65. Since the pointing stick device 60 is stably positioned and supported at the elevated position which is the use position, high operability can be achieved.

The link member 36 transmits the driving force of the drive member 34 to the drive member 35, by rotation of the rotation arm 42. Thus, by use of the moment of the moving force of the drive member 34 driven by the drive mechanism 38, the link member 36 can move the drive member 35 efficiently and with a great force.

The present invention is not limited to the foregoing embodiment, and changes can be freely made without departing from the scope of the present invention.

The above describes the structure including both the key position setting mechanism 28 and the stick position setting mechanism 30, as an example. However, for example in the case where the electronic apparatus 10 does not include the pointing stick device 60, the stick position setting mechanism 30 is omitted. Moreover, for example in the case where the electronic apparatus 10 needs to lower only the pointing stick 22 when not in use, the key position setting mechanism 28 may be omitted.

The above describes the structure in which the slide member 48 moves to the rear when the display chassis 14 is opened from the 0° position and the slide member 48 moves to the front when the display chassis 14 is closed from the 360° position, as an example. This relationship between the rotation direction of the display chassis 14 and the moving direction of the slide member 48 may be reversed.

The above describes the structure in which the drive mechanism 38 uses the electric motor 50b and the speed reducer 50c as the drive source 50, as an example. Instead of the electric motor 50b and the speed reducer 50c, for example, an automatic mechanism may be used to move the slide member 48 depending on the rotation of the hinge 12.

The above describes the structure in which the keytops 24 or the pointing stick 22 is set at the use position or the elevated position at the 30° position, as an example. The angle of switching the position of the keytops 24 or the pointing stick 22 may be other than 30°.

As has been described, the present invention provides an electronic apparatus capable of preventing an operation member, such as keytops or a pointing stick, from protruding from a top surface of the electronic apparatus when the electronic apparatus is not being in use.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
   a base plate;
   a plurality of keytops supported on a top surface of said base plate, wherein one of said keytops is movable up and down between a first position to which said one keytop ascends by a biasing force of an elastic member and a second position to which said one keytop descends against the biasing force of said elastic member;
   a plurality of drive members, wherein one extends along a left-right direction on said top surface side of said base plate, movable in said left-right direction relative to said keytops;
   a link member connects a subset of said drive members adjacent in said front-rear direction to enable coordinated operation; and
   a drive mechanism moves one of said drive members connected by said link member, wherein said plurality of keytops each include a pressed part, wherein said plurality of drive members each include a pressing part that, when said drive member moves relative to said keytop, presses said pressed part to move said keytop from said first position to said second position, and when said drive mechanism moves one of said drive members connected by said link member, said link member moves an other one of said drive members using said movement of said one drive member.

2. The electronic apparatus of claim 1, wherein said link member includes a rotation arm that has one end rotatably connected to said one drive member by a first connection shaft, an other end rotatably connected to said other drive member by a second connection shaft, and a center rotatably supported by a rotation shaft.

3. The electronic apparatus of claim 2, wherein when said one drive member moves in one direction, said rotation arm rotates about said rotation shaft to move said other drive member in an other direction opposite to said one direction.

4. The electronic apparatus of claim 2, further comprising an elastic body for biasing said rotation arm in a rotation direction for moving said other drive member in said other direction.

5. The electronic apparatus of claim 1, wherein said link member is located at one end of said drive members.

6. The electronic apparatus of claim 5, wherein said drive mechanism includes
   a slide member located at an other end of said drive members, is movable relative to said drive members, for pressing said one drive member; and
   a drive source for moving said slide member.

7. The electronic apparatus of claim 6, further comprising:
   a main body chassis; and
   a display chassis rotatably connected to said main body chassis by a hinge, wherein said drive source moves said slide member when said display chassis is rotated with respect to said main body chassis.

8. An electronic apparatus comprising:
   a base plate;
   a pointing stick device includes a pointing stick located on a top surface side of said base plate and a base member supporting said pointing stick, and is movable up and down between a lowered position to which said pointing stick device descends by a biasing force of an elastic member and an elevated position to which said pointing stick device ascends against said biasing force of said elastic member;
   a plurality of drive members movable relative to said base plate;
   a link member connects adjacent drive members to enable coordinated operation; and
   a drive mechanism moves one of said drive members connected by said link member, wherein said base member includes a pressed part, wherein said plurality of drive members each include a pressing part that, when said drive member moves relative to said base plate, presses said pressed part to move said pointing stick device from said lowered position to said elevated position, and when said drive mechanism moves one of said drive members connected by said link member, said link member moves an other one of said drive members using said movement of said one drive member.

9. The electronic apparatus of claim 8, wherein said pressed part includes a first pressed part located at one edge of said base member and a second pressed part located at an other edge of said base member opposite to said one edge.

10. The electronic apparatus of claim 9, wherein said plurality of drive members include a first drive member located along said one edge of said base member, and a second drive member located along said other edge of said base member, and wherein said pressing part of said first drive member for pressing said first pressed part, and said pressing part of said second drive member for pressing said second pressed part.

11. The electronic apparatus of claim 9, wherein said base member further includes a first support part located on one side between said first pressed part and said second pressed part, and a second support part located on an other side opposite to said one side between said first pressed part and said second pressed part.

12. The electronic apparatus of claim 11, wherein said plurality of drive members further include a third drive member provided with a support piece for supporting a bottom surface of said first support part between said first drive member and said second drive member, and a fourth drive member provided with a support piece for supporting a bottom surface of said second support part between said first drive member and said second drive member.

13. An electronic apparatus comprising:
a base plate;
a plurality of keytops supported on a top surface side of said base plate, each movable up and down between a first position to which said keytop ascends by a biasing force of an elastic member and a second position to which said keytop descends against said biasing force of said elastic member;
a pointing stick device having a pointing stick located on a top surface side of said base plate and a base member located on a bottom surface side of said base plate and supporting said pointing stick, and is movable up and down between a lowered position to which said pointing stick device descends by a biasing force of an elastic member and an elevated position to which said pointing stick device ascends against said biasing force of said elastic member;
a drive member extends along a left-right direction on said top surface side of said base plate, and is movable in said left-right direction relative to said keytops and said pointing stick; and
a drive mechanism for moving said drive member, wherein said plurality of keytops each include a key-side pressed part, wherein said base member includes a stick-side pressed part located on said top surface side of said base plate through a hole part in said base plate, and said drive member includes
a key pressing part for pressing said key-side pressed part to move said keytop from said first position to said second position when moving in one direction; and
a stick pressing part for pressing said stick-side pressed part to move said pointing stick device from said lowered position to said elevated position when moving in an other direction opposite to said one direction.

14. The electronic apparatus of claim 13, wherein said drive member includes a plurality of drive members that are aligned along said front-rear direction, drive members adjacent in said front-rear direction being connected by a link member to enable coordinated operation.

15. The electronic apparatus of claim 14, wherein said drive mechanism moves one of said drive members connected by said link member.

* * * * *